(12) United States Patent
Masuda et al.

(10) Patent No.: US 11,438,184 B2
(45) Date of Patent: *Sep. 6, 2022

(54) CONFERENCE SYSTEM, VIDEO CONFERENCE APPARATUS, AND VIDEO IMAGE PROCESSING METHOD

(71) Applicant: PANASONIC INTELLECTUAL PROPERTY MANAGEMENT CO., LTD., Osaka (JP)

(72) Inventors: Hiroshige Masuda, Fukuoka (JP); Satoshi Yashiki, Fukuoka (JP); Keita Waseda, Fukuoka (JP); Naoki Koga, Fukuoka (JP); Hitoshi Yamada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,319

(22) Filed: Aug. 23, 2021

(65) Prior Publication Data

US 2022/0182250 A1    Jun. 9, 2022

(30) Foreign Application Priority Data

Dec. 4, 2020   (JP) .............................. JP2020-202152

(51) Int. Cl.
*H04L 12/18* (2006.01)
(52) U.S. Cl.
CPC ...... *H04L 12/1822* (2013.01); *H04L 12/1827* (2013.01)

(58) Field of Classification Search
CPC .................... H04L 12/1822; H04L 12/1827
See application file for complete search history.

(56) References Cited

U.S. PATENT DOCUMENTS

| 7,176,957 | B2 * | 2/2007 | Ivashin | .................. H04N 7/152 348/14.09 |
| 9,674,487 | B2 * | 6/2017 | Yoshida | .................. H04M 3/22 |
| 10,306,184 | B1 * | 5/2019 | Petrov | .................... H04N 7/157 |
| 2004/0257433 | A1 | 12/2004 | Lia et al. | |
| 2011/0261151 | A1 | 10/2011 | Wang et al. | |
| 2013/0096904 | A1 * | 4/2013 | Hui | ....................... H04L 65/605 703/21 |
| 2018/0048866 | A1 | 2/2018 | Takita | |
| 2018/0285820 | A1 * | 10/2018 | Vendrow | .............. G06Q 10/109 |
| 2019/0268569 | A1 * | 8/2019 | Takita | .................... G06F 3/167 |
| 2019/0379839 | A1 * | 12/2019 | Hellerud | ................ H04N 5/243 |
| 2021/0125602 | A1 * | 4/2021 | Hakata | .................... G10L 15/22 |

FOREIGN PATENT DOCUMENTS

JP       2009-141508 A     6/2009

* cited by examiner

*Primary Examiner* — John A Follansbee
*Assistant Examiner* — Raqiul A Choudhury
(74) *Attorney, Agent, or Firm* — Seed IP Law Group LLP

(57) ABSTRACT

A video conference apparatus includes a relay unit that is configured to transmit video image data acquired at a site of a first conference system to a second terminal provided in a second conference system and transmit video image data of the second conference system to a first terminal provided in the first conference system. The relay unit is configured to transmit only a combined video image of video images at respective sites of the first conference system to the second terminal as first video image data, and transmit a video image sent from the second terminal to the first terminal as second video image data.

17 Claims, 18 Drawing Sheets

CONFERENCE SYSTEM, VIDEO CONFERENCE APPARATUS, AND VIDEO IMAGE PROCESSING METHOD

CROSS REFERENCE TO RELATED APPLICATIONS

This application is based upon and claims the benefit of priority of Japanese Patent Application No. 2020-202152 filed on Dec. 4, 2020, the contents of which are incorporated herein by reference in its entirety.

BACKGROUND OF THE INVENTION

The present disclosure relates to a conference system, a video conference apparatus, and a video image processing method.

A video conference system that establishes a communication path between a plurality of sites and transfers a video image and audio to conduct a conference has been used. Patent Literature 1, JP-A-2009-141508 discloses a video conference apparatus that realizes a video conference for performing nursing care at connecting multiple points. The video conference apparatus disclosed in JP-A-2009-141508 receives a table image transmitted from another video conference apparatus, generates a table image obtained by removing an image displayed on a display device from an image obtained by imaging a surface including the display device of the conference table using the received image using the received image, and transmits the generated table image to another video conference apparatus. With this configuration, it is possible to reduce the cost while solving a problem of video loop, and to realize a flexible disposition of the devices according to a situation of a conference room.

Patent Literature 1: JP-A-2009-141508

SUMMARY OF THE INVENTION

An object of the present disclosure is to provide a conference system, a video conference apparatus, and a video image processing method that suppress occurrence of looping of a video image when transferring the video image by making a plurality of conference systems cooperate with each other and allows an appropriate conference video image to be shared between the plurality of conference systems.

According to an aspect of the present disclosure, there is provided a conference system including a first terminal that is configured to transmit and receive video image data acquired at a site of a first conference system, a second terminal that is configured to transmit and receive video image data acquired at a site of a second conference system, and a relay unit that is configured to mutually transfer data between the first terminal and the second terminal, transmit first video image data to the second terminal, and transmit second video image data to the first terminal, in which the relay unit is configured to transmit only a combined video image of video images at respective sites of the first conference system to the second terminal as the first video image data and transmit a video image sent from the second terminal to the first terminal as the second video image data.

According to another aspect of the present disclosure, there is provided a video conference apparatus including a relay unit that is configured to transmit video image data acquired at a site of a first conference system to a second terminal provided in a second conference system and transmits video image data of the second conference system to a first terminal provided in a first conference system, in which the relay unit is configured to transmit only a combined video image of video images at respective sites of the first conference system to the second terminal as first video image data and transmit a video image sent from the second terminal to the first terminal as second video image data.

According to still another aspect of the present disclosure, there is provided a video image processing method in a video conference apparatus including a relay unit that transmits video image data acquired at a site of a first conference system to a second terminal provided in a second conference system and transmits video image data of the second conference system to the first terminal provided in the first conference system, the video image processing method includes transmitting only a combined video image of video images at respective sites of the first conference system to the second terminal as first video image data and transmitting a video image sent from the second terminal to the first terminal as second video image data.

According to the present disclosure, occurrence of looping of a video image is reduced when transferring the video image by making a plurality of conference systems cooperate with each other, and an appropriate conference video image can be shared between the plurality of conference systems.

DESCRIPTION OF EMBODIMENTS

Background of Embodiments

In a video conference system in which a video image and audio are transferred between a plurality of sites to conduct a conference, there is a demand for making different conference systems cooperate with each other so that a plurality of conference systems share a video image to conduct a conference. For example, a configuration is conceivable in which a video conference system for conducting a video conference using a video conference terminal between a plurality of sites and a Web conference system for conducting a Web conference via the Internet using a terminal such as a PC are made to cooperate with each other to allow sharing of a conference video image between the two systems. A configuration is also conceivable in which a system is connected to another company's system having different specifications to allow sharing of a video image of a video conference between a plurality of systems.

When the plurality of conference systems are made to cooperate with each other as described above, usually, the video images of each other's conference systems are transferred, and conference video images of the cooperating counterpart systems are combined and displayed in each conference system. In this case, there is a problem that a so-called video loop occurs in which the combined conference video is returned to the counterpart's conference system, and the same video image is repeatedly transferred and a video image like two opposite mirrors is displayed by repetitive returning of the combined conference video to the counterpart's conference system.

Hereinafter, embodiments which specifically disclose the configurations of the conference system, the video conference apparatus, and the video image processing method according to the present disclosure will be described in detail with reference to the drawings as appropriate. However, more detailed description than necessary may be omitted. For example, detailed descriptions of already well-known matters and repeated descriptions for substantially the same configuration may be omitted. This is to avoid the following description from becoming unnecessarily redundant and to facilitate understanding by those skilled in the art. The accompanying drawings and the following description are provided to enable those skilled in the art to fully understand the present disclosure, and are not intended to limit the claimed subject matter.

In the following, a plurality of examples of a conference system in which occurrence of looping of a video image is suppressed by transferring without including a video image of its own site at a relay point when transferring the video image by making a plurality of conference systems cooperate with each other and an appropriate conference video image can be shared between the plurality of conference systems will be described.

Embodiments

Figure 1:
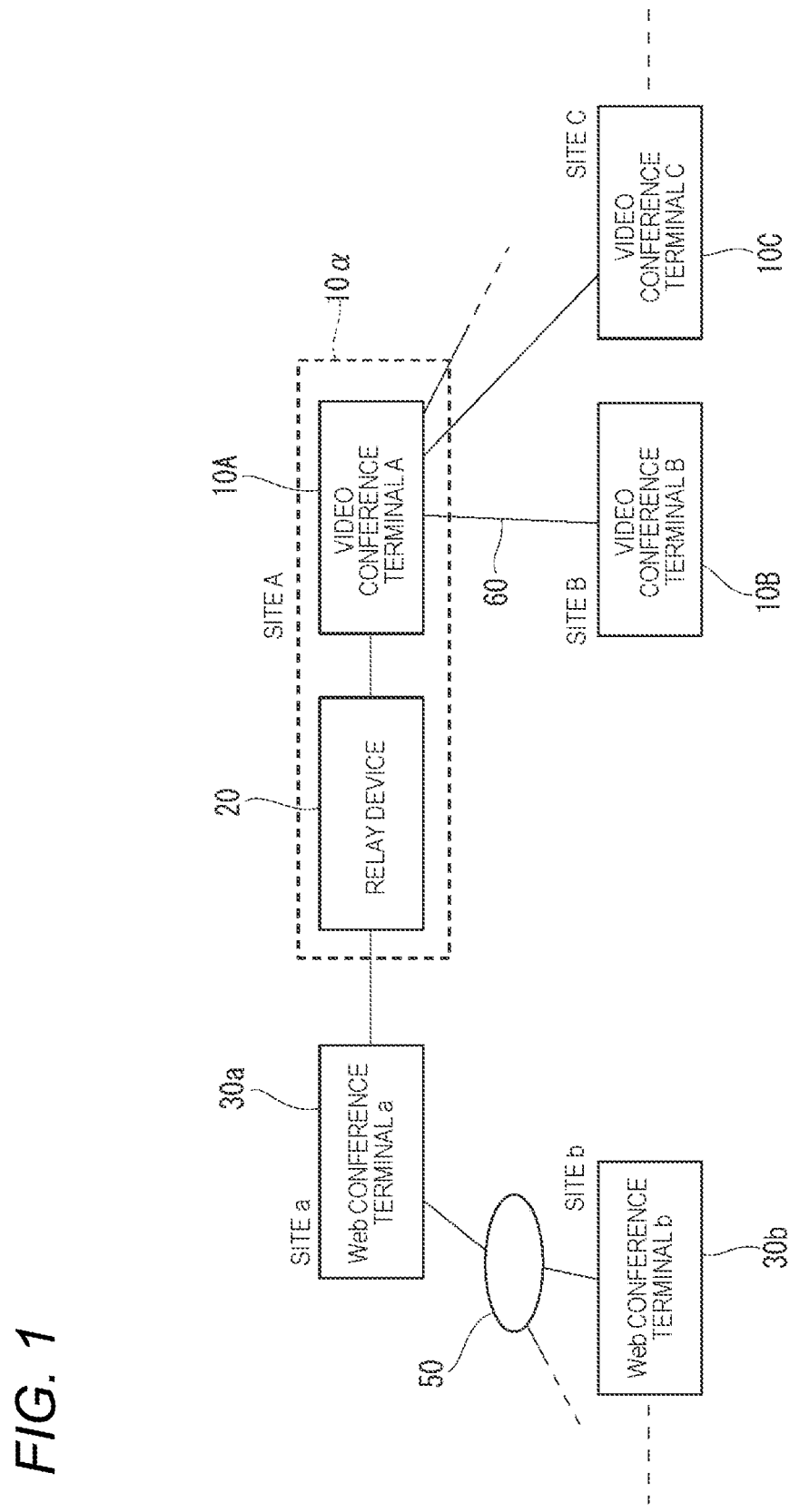
FIG. 1 is a block diagram illustrating an example of a schematic configuration of a conference system according to a first embodiment.

FIG. 1 is a block diagram illustrating an example of a schematic configuration of a conference system according to this embodiment. In this embodiment, as a configuration example of a video conference system in which a plurality of conference systems are made to cooperate with each other, a configuration in a case where a first conference system and a second conference system are made to cooperate with each other by being connected to each other via a relay device at a specific site is exemplified. In the following, it is assumed that a video conference system is used as an example of the first conference system, and a Web conference system is used as an example of the second conference system.

A site A is provided with a video conference terminal A (10A) (hereinafter also referred to as a "video conference terminal 10A") as an example of a first terminal that transmits and receives a video image and audio by the video conference system. The video conference terminal 10A is connected to a video conference terminal B (10B) (hereinafter, also referred to as a "video conference terminal 10B") provided at a site B and a video conference terminal C (10C) (hereinafter, "video conference terminal 10C") provided at a site C via a communication channel 60. As the communication channel 60, for example, an IP network constructed in a public data communication network or a closed data communication network is used. In the illustrated example, although a configuration in which three video conference terminals are connected is illustrated, a configuration in which two video conference terminals are connected to each other, a configuration in which four or more video conference terminals are connected to each other may be adopted, and the number of terminals is not limited.

The video conference terminals 10A, 10B, and 10C can share the video images and audio at respective sites between the terminals of the video conference system by transferring the video image and audio data (hereinafter, also referred to as "video image and audio data") of their own sites acquired by imaging at their own terminals to a terminal at another site. For example, the video conference terminal 10A becomes a master terminal, acquires and combines the video of the terminal at each site, and transfers the combined video image of a plurality of sites to the video conference terminals 10B and 10C at other sites. Then, the video conference terminals 10A, 10B, and 10C display and reproduce the acquired video image and audio on a display unit (see FIG. 2). With this configuration, in each of the video conference terminals 10A, 10B, and 10C connected to the video conference system, the combined video image of the plurality of sites is displayed on the display unit (see FIG. 2), and a conference participant can view and share the combined video at each site and grasp a state of each other's sites.

Also, at a site a, which is the same site as the site A, a Web conference terminal a (30a) (hereinafter also referred to as a "Web conference terminal 30a") as an example of a second terminal that transmits and receives a video image and audio by the Web conference system is provided. The video conference terminal 10A is connected to a relay device 20 as an example of a relay unit that connects and makes the video conference system and the Web conference system cooperate with each other, and the video conference terminal 10A and the Web conference terminal 30a are connected via the relay device 20. The relay device 20 is also called a gateway box (GWB). As an example of the video conference apparatus, a video conference terminal 10a which is configured as an integrated device including the video conference terminal 10A and the relay device 20 and has a function of the relay device 20 may be provided.

The Web conference terminal 30a is connected via a network 50 to a Web conference terminal b (30b) (hereinafter, also referred to as "Web conference terminal 30b") provided at a site b. As the network 50, for example, an IP network constructed in a public data communication network such as the Internet is used. In the illustrated example, although a configuration in which two Web conference terminals are connected is illustrated, a configuration in which three or more Web conference terminals are connected may be adopted, and the number of terminals is not limited.

The Web conference terminals 30a and 30b can share the video images and audio at respective sites between the terminals of the Web conference system by transferring the video image and audio data of their own sites acquired by imaging at their own terminals to a terminal at another site. For example, in each of the Web conference terminals 30a and 30b, the video image of its own terminal and the video image of the other terminal are combined, and the acquired video image and audio are displayed and reproduced on the display unit (see FIG. 2). With this configuration, in each of the Web conference terminals 30a and 30b connected to the Web conference system, the combined video image of the plurality of sites is displayed on the display unit (see FIG. 2), and a conference participant can view and share the combined video at each site and grasp states of each other's sites.

In a first embodiment, the relay device 20 transfers the video image and audio data of the video conference system acquired by the video conference terminal 10A as an example of first video image data to the Web conference terminal 30a. The relay device 20 transfers the video image and audio data of the Web conference system acquired by the Web conference terminal 30a as an example of second video image data to the video conference terminal 10A. The video conference terminal 10A transfers the video image and audio data of the Web conference system transferred from the Web conference terminal 30a via the relay device 20 to the video conference terminals 10B and 10C at other sites as an example of a third terminal. The Web conference terminal 30a transfers the video image and audio data of the video conference system transferred from the video conference terminal 10A via the relay device 20 to the Web conference terminal 30b at another site as an example of a fourth terminal. With this configuration, the video image and audio can be mutually shared between a plurality of conference systems of the video conference system and the Web conference system. The number of conference systems interconnected by the relay device 20 is not limited to two in the illustrated example, a configuration in which three or more conference systems are connected may be adopted, and the number of the first conference systems and/or the second conference systems is not limited. In addition, information sharing between a plurality of conference systems is not limited to the video image data and audio data obtained by imaging a conference participant at each site, and various contents such as image data such as conference materials, moving image data, and sound data can be mutually transferred and shared with other conference systems.

Figure 2:
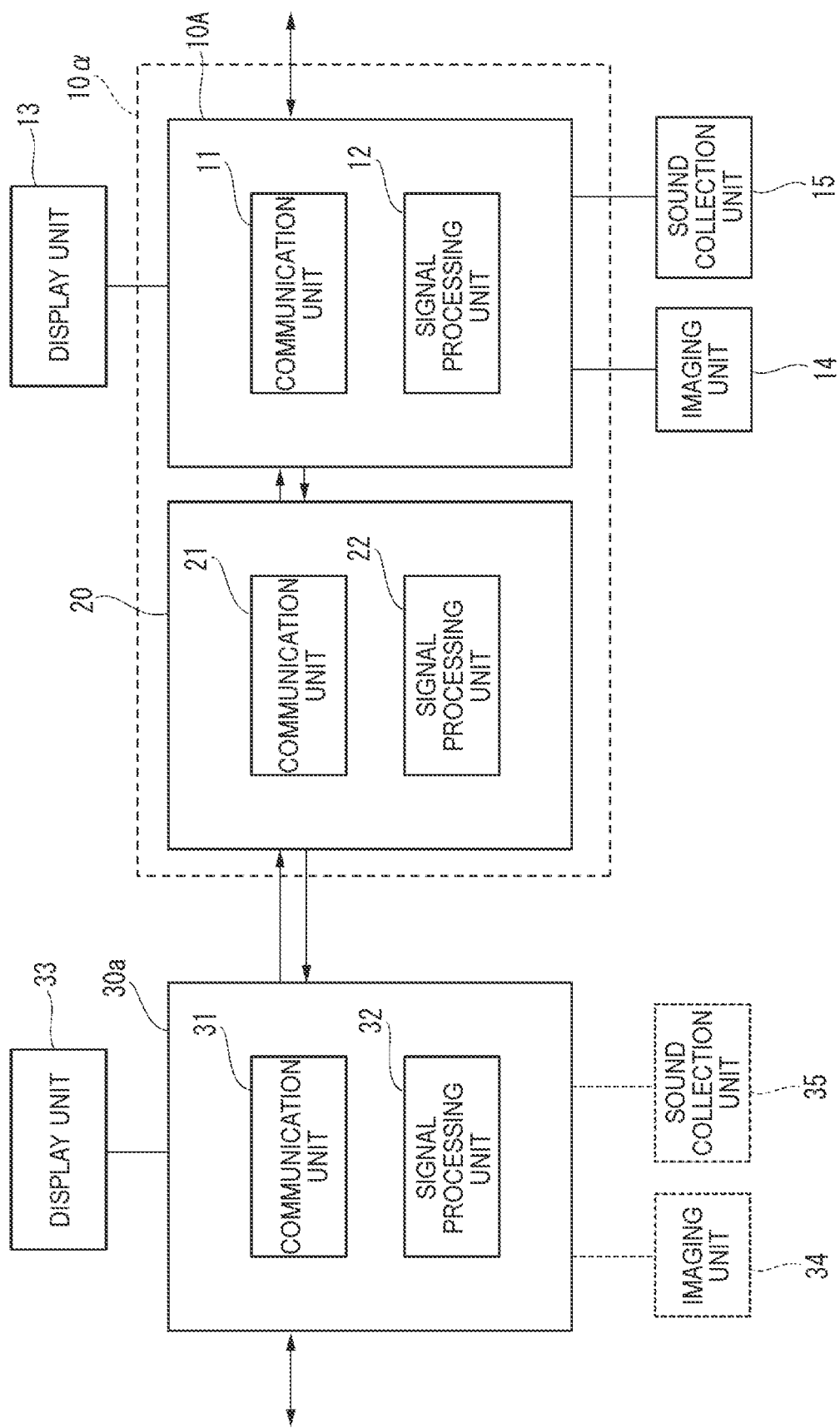
FIG. 2 is a block diagram illustrating a functional configuration of an apparatus in the conference system according to the first embodiment.

FIG. 2 is a block diagram illustrating a functional configuration of an apparatus in the conference system according to this embodiment. The video conference terminal 10A includes a communication unit 11 and a signal processing unit 12, and is connected to a display unit 13, an imaging unit 14, and a sound collection unit 15. The display unit 13 includes a display device such as a liquid crystal display or an organic electroluminescence (EL) display, and displays a video image in the conference system. The imaging unit 14 includes, for example, a camera including an imaging lens and an imaging device such as an image sensor, and acquires video image data by imaging contents such as conference participants or materials at the site. The sound collection unit 15 is configured by a sound collection device such as a microphone, for example, and collects sound at a site to acquire audio data. The communication unit 11 includes a communication protocol such as a session initiation protocol (SIP), H.323, and the like, and communicates with a terminal at another site of the video conference system and the relay device 20, respectively, to transmit and receive video image and audio data and control data. The signal processing unit 12 includes a processor and a memory, and executes signal processing such as encoding and decoding of video image and audio data, video image combining, and video image division.

The relay device 20 includes a communication unit 21 and a signal processing unit 22. The communication unit 21 includes a communication interface, and communicates with the video conference terminal 10A and the Web conference terminal 30a, respectively, to transmit and receive video image and audio data and control data. The signal processing unit 22 includes a processor and a memory, and executes signal processing such as encoding and decoding of video image and audio data, video image combining, and video image division. The video conference terminal 10A and the relay device 20 are connected by a communication path such as a local area network (LAN). The Web conference terminal 30a and the relay device 20 are connected by a communication path corresponding to a communication standard such as high-definition multimedia interface (HDMI) (registered trademark) and universal serial bus (USB). The Web conference terminal 30a and the relay device 20 are connected by, for example, an HDMI (registered trademark) cable and a USB cable, and bidirectional data transfer is performed between the two devices by allowing video image and audio data to be transferred using respective communication cables. For example, with respect to the relay device 20, video image and audio data are transferred from the Web conference terminal 30a to the relay device 20 by an HDMI (registered trademark) output of the terminal. In addition, the video image and audio data are transferred from the relay device 20 to the Web conference terminal 30a as inputs to the camera and the microphone by a USB input of the terminal.

The Web conference terminal 30a is configured by an information processing terminal such as a notebook PC or a tablet terminal, includes a communication unit 31, a signal processing unit 32, and is connected to a display unit 33, an imaging unit 34, and a sound collection unit 35. When the Web conference terminal 30a is connected to the video conference terminal 10A via the relay device 20, the Web conference terminal 30a turns off the functions of the imaging unit 34 and the sound collection unit 35, and shares the imaging unit 14 and the sound collection unit 15 of the video conference terminal 10A. The communication unit 31 includes a communication interface corresponding to a communication system such as (Web Real-Time Communications (Web RTC) or Skype for Business, and communicates with a terminal at another site of the Web conference system and the relay device 20, respectively, to transmit and receive the video image and audio data and control data. The signal processing unit 32 includes a processor and a memory, and executes signal processing such as encoding and decoding of video image and audio data, video image combining, and video image division.

Figure 3:
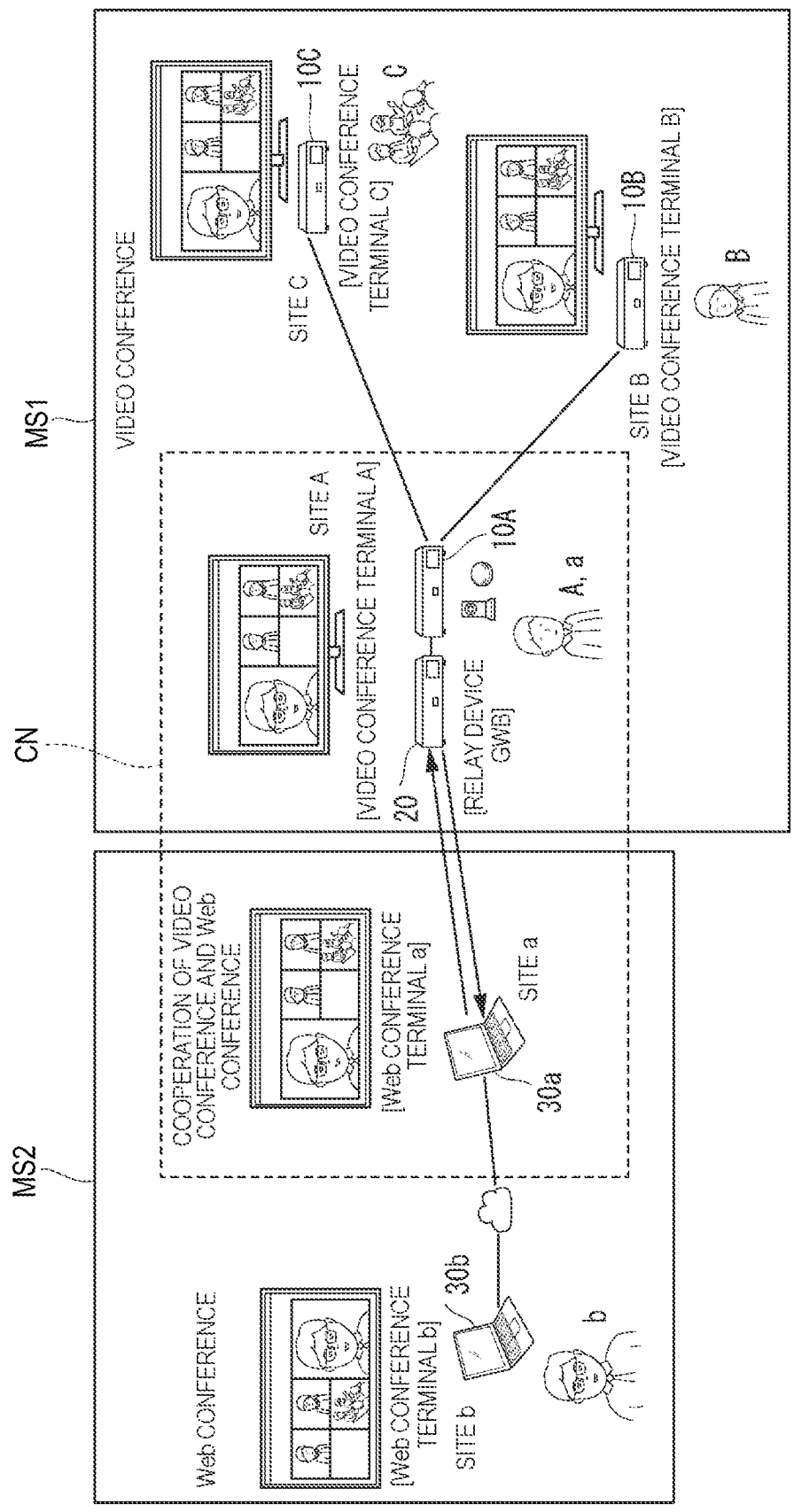
FIG. 3 is a diagram illustrating a specific example during operation in the conference system according to the first embodiment.

FIG. 3 is a diagram illustrating a specific example during operation in the conference system according to the first embodiment. The first embodiment includes a cooperating unit CN that makes a video conference system and a Web conference system cooperate with each other as a conceptual system configuration that makes a plurality of conference systems cooperate with each other. The cooperating unit CN connects the video conference system MS1 and the Web conference system MS2, and relays the video image and audio data by relaying the two conference systems.

At the site A (site a) functioning as the cooperating unit CN, the video images A and a of the conference participants at the site A are imaged and acquired by the video conference terminal 10A. Here, the video image A is a video image for the video conference system MS1, and the video image a is a video image for the Web conference system MS2. At the site B of the video conference system MS1, the video image B of the conference participant at the site B is imaged, acquired by the video conference terminal 10B, and transferred to the video conference terminal 10A at the site A. At the site C of the video conference system MS1, the video image C of the conference participant at the site C is imaged and acquired by the video conference terminal 10C, and transferred to the video conference terminal 10A at the site A.

The video conference terminal 10A at the site A performs a process of combining the video image A, the video image B, and the video image C at the three sites, transmits the generated combined video image ABC to the video conference terminal 10B at the site B and the video conference terminal 10C at the site C, and displays the combined video image ABC on the display unit (see FIG. 2) of its own terminal. The video conference terminal 10B at the site B and the video conference terminal 10C at the site C each receive the combined video image ABC and display the combined video image ABC on the display unit (see FIG. 2) of their own terminal. With this configuration, in each of the sites A, B, and C, the combined video image ABC is displayed on the display unit (see FIG. 2), and the video image of each site during the conference is shared.

The video conference terminal 10A outputs the video image A (video image a) of its own site A or the combined video image ABC of the video conference system to the relay device 20. The relay device 20 transmits the video image a or the combined video image ABC acquired from the video conference terminal 10A to the Web conference terminal 30a. On the other hand, at the site b of the Web conference system MS2, the video image b of the conference participant at the site b is imaged, acquired by the Web conference terminal 30b, and transferred to the Web conference terminal 30a at the site a.

In the single Web conference system MS2, the Web conference terminal 30a transmits the video image a of its own site a to the Web conference terminal 30b of the site b and receives the video image b of the site b from the Web conference terminal 30b, and the video image a of its own site a and the video image b of another site b are combined and displayed on the display unit. The Web conference terminal 30b transmits the video image b of its own site b to the Web conference terminal 30a of the site a, receives the video image a of the site a from the Web conference terminal 30a, and combines the video image b of its own site b and the video image a of another site a to be displayed on the display unit (see FIG. 2).

When the video conference system MS1 and the Web conference system MS2 are connected and made to cooperate with each other by the relay device 20, the relay device 20 transmits the combined video image ABC of the video conference system MS1 to the Web conference terminal 30a. The Web conference terminal 30a receives the combined video image ABC transferred from the relay device 20 instead of the video image a of its own site a, transmits the combined video image ABC to the Web conference terminal 30b of the other site b, and combines the combined video image ABC and the video image b of another site b to be displayed on the display unit (see FIG. 2). The Web conference terminal 30b transmits the video image b of its own site b to the Web conference terminal 30a of the other site a, and combines the video image b of its own site b and the combined video image ABC transferred from another site a to be displayed on the display unit (see FIG. 2).

In the first embodiment, when transmitting a video image from the video conference terminal 10A to the Web conference terminal 30a of the Web conference system side, the relay device 20 transfers only the combined video image ABC of the respective sites A, B, and C of the video conference system as the first video image data. Then, in the Web conference system, the relay device 20 transfers the combined video image ABC from the Web conference terminal 30a to the Web conference terminal 30b at another site b. When transmitting a video image from the Web conference terminal 30a to the video conference terminal 10A of the video conference system, the relay device 20 transfers the video image sent from the Web conference terminal 30a as the second video image data. Then, the relay device 20 transfers the video image using the video conference terminal 10A to the video conference terminals 10B and 10C at the sites B and C. With this configuration, the occurrence of a video loop phenomenon in which a video image like a mirror with repeated nesting of the combined video image is displayed is prevented without transferring the same video image.

Figure 4:
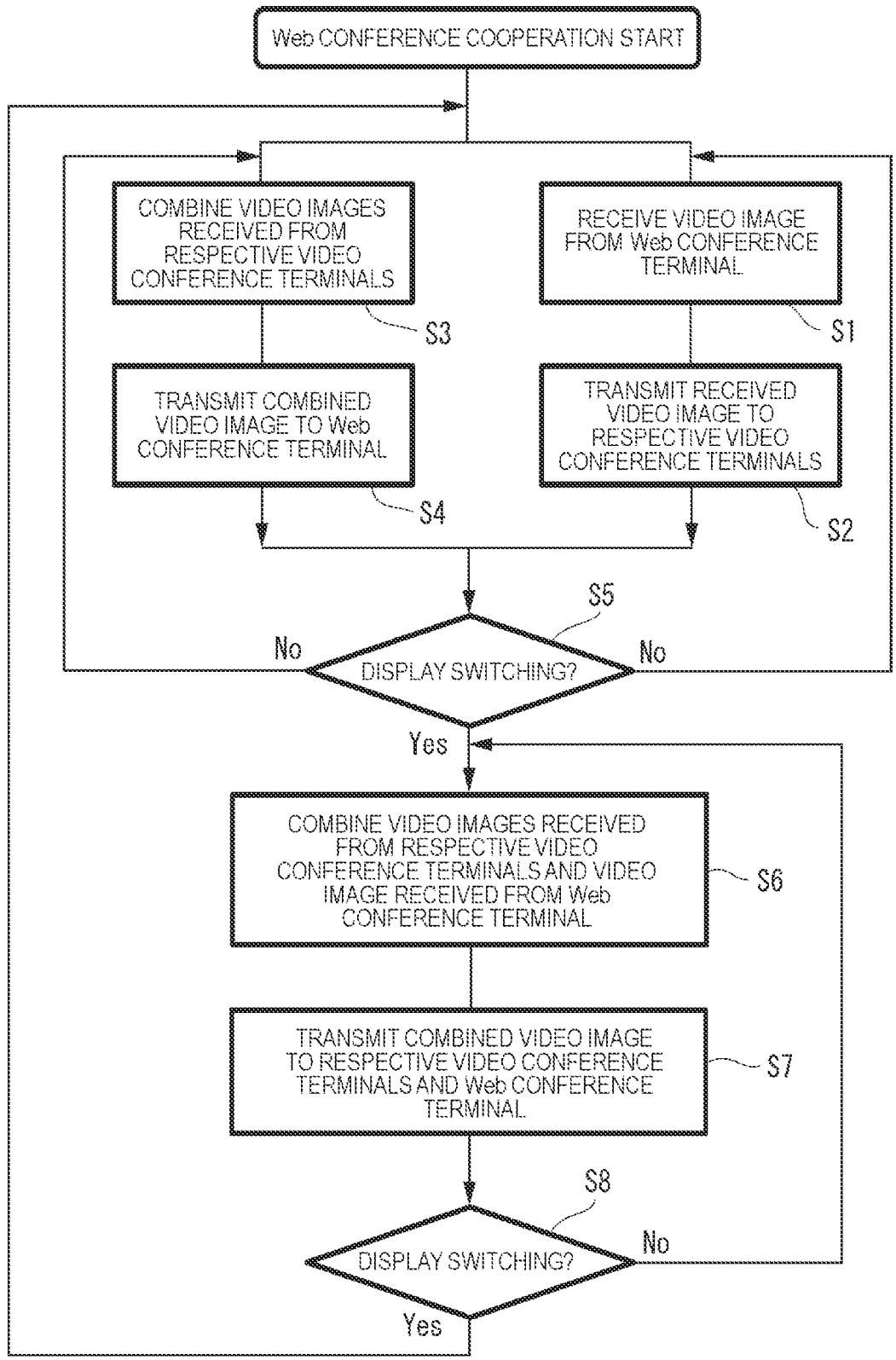
FIG. 4 is a flowchart illustrating an example of an operation procedure in the conference system according to the first embodiment.

FIG. 4 is a flowchart illustrating an example of an operation procedure in the conference system according to this embodiment. Hereinafter, a description will be made on an example of processing of video image and audio data in the relay device 20 and the video conference terminal 10A when a cooperative operation between a plurality of conference systems is performed.

The relay device 20 and the video conference terminal 10A start cooperation between the video conference system and the Web conference system based on a manipulation instruction input by a user of a conference participant. For example, when a cooperation start manipulation from the normal video conference mode to the Web conference cooperation mode is performed on the video conference terminal 10A at the site A, the relay device 20 and the video conference terminal 10A starts a cooperative operation for making the conference system cooperate. The manipulation instruction input such as start of cooperation and display switching in the conference system is input by the user of the conference participant at the video conference terminal 10A or another terminal, for example.

The relay device 20 receives the video image a from the Web conference terminal 30a (S1). Then, the relay device 20 transfers the received video image a to the video conference terminal 10A, and the video conference terminal 10A transmits the video image a to the video conference terminals 10B and 10C at respective sites (S2). The video conference terminal 10A receives the video image from the video conference terminals 10B and 10C at the respective sites and combines the received video images (S3). In this case, the video image A, the video image B, and the video image C of each of the sites A, B, and C of the video conference system are received, and the received video images are combined to generate a combined video image ABC. Then, the video conference terminal 10A transfers the combined video image ABC to the relay device 20, and the relay device 20 transmits the combined video image ABC to the Web conference terminal 30a (S4).

The relay device 20 and the video conference terminal 10A determine whether or not a manipulation instruction input for display switching for the conference video image is input (S5). The relay device 20 and the video conference terminal 10A repeatedly execute processing of S1 to S4 until a display switching manipulation is performed by the user of the conference participant and the instruction input for display switching is received. With this configuration, the video conference system and the Web conference system can transmit and receive each other's video images and can share the video images.

When the manipulation instruction input for display switching of the conference video image by the user of the conference participant is received (Yes in S5), the relay device 20 and the video conference terminal 10A switch the video image display mode. This display switching operation is executed when a display switching manipulation is performed so that only the video image b of the Web conference terminal 30b is displayed on the Web conference terminal 30a, and the display switching manipulation for disabling a video loop avoidance function described later is performed. In this case, the relay device 20 and the video conference terminal 10A combine the video image A of the video conference terminal 10A, the video images B and C received from the video conference terminals 10B and 10C at the respective sites, and the video image b received from the Web conference terminal 30a, and generates a combined video image ABCb (S6). Then, the relay device 20 and the video conference terminal 10A transmit the combined video image ABCb to the video conference terminals 10B and 10C and the Web conference terminal 30a at the respective sites (S7).

The relay device 20 and the video conference terminal 10A determine whether or not the manipulation instruction input for display switching is performed (S8). The relay device 20 and the video conference terminal 10A repeatedly execute processing of S6 and S7 until the display switching manipulation is performed by the user of the conference participant and the manipulation instruction input for display switching is received. With this configuration, the relay device 20 and the video conference terminal 10A receive and combine the video images of the Web conference system and the video conference system, and transmit the combined video image to the respective conference systems to allow the combined video image to be shared.

When the manipulation instruction input for the display switching is received by the user of the conference participant (Yes in S8), the relay device 20 and the video conference terminal 10A proceed to the processing of S1 to S4 and switch the video image display mode.

Next, the operation of the video conference system according to this embodiment will be described using a specific example of a display video image when a cooperative operation of a plurality of conference systems is performed.

Figure 5:
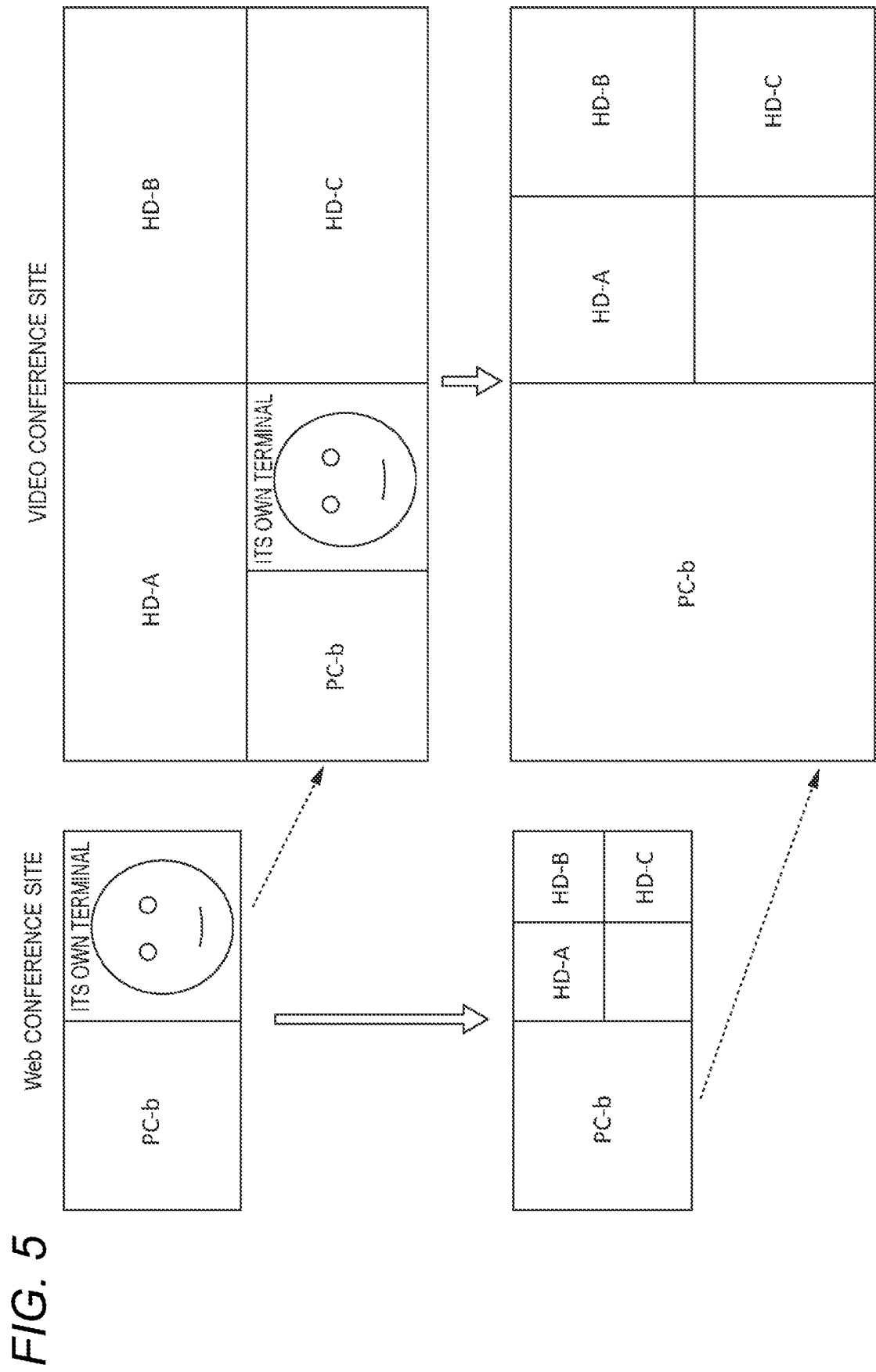
FIG. 5 is a diagram illustrating a first example of a display screen in the conference system according to the first embodiment.

FIG. 5 is a diagram illustrating a first example of a display screen in the conference system according to this embodiment. In FIG. 5, a video image of the site A of the video conference system is indicated by HD-A, a video image of the site B of the video conference system is indicated by HD-B, a video image of the site C of the video conference system is indicated by HD-C, and a video image of the site b of the Web conference system is indicated by PC-b. The site a of the Web conference system and the site A of the video conference system are the same, and the video image of its own terminal indicated by a face image is the same as the HD-A.

The first example of the display screen illustrated in FIG. 5 is an example in which a combined video image of the video image of the Web conference system and the video image of the video conference system is not transmitted to the Web conference system. In this first example, only the combined video image of the video conference system is transmitted to the Web conference system without combining the video image of the Web conference system and the video image of the video conference system, and the combined video image is shared between a plurality of conference systems.

Prior to the start of the cooperative operation between the video conference system and the Web conference system, at the sites a and b of the Web conference system, although not illustrated, a combined video image PC-a/b obtained by combining the video images PC-a and PC-b of each other is displayed. At the sites A, B, and C of the video conference system, although not illustrated, a combined video image HD-A/B/C obtained by combining the video images HD-A, HD-B, and HD-C is displayed. Immediately after the start of the cooperative operation, at the sites A, B, and C of the video conference system, in addition to the combined video image HD-A/B/C, the combined video image PC-a/b of the Web conference system is combined and displayed. In this specification, a plurality of combined video images are indicated in a form described side by side using "/" in such a way that a video image obtained by combining the video image HD-A, the video image HD-B, and the video image HD-C is described as a "combined video image HD-A/B/C", a video image obtained by combining the video image PC-a and the video image PC-b is described as a "combined video image PC-a/b, and a video image obtained by combining the video image PC-b and the video image HD-A is described as a "combined video image PC-b/HD-A".

Within a short time after the cooperative operation is started, the video loop avoidance function is enabled, and only the combined video image HD-A/B/C of the respective sites A, B, and C is transmitted from the video conference system to the Web conference system. With this configuration, at the site a of the Web conference system, the video image PC-b/HD-A/B/C obtained by combining the video image PC-b and the combined video image HD-A/B/C is displayed. Also, the video image PC-b HD-A/B/C is transmitted from the Web conference system to the video conference system. With this configuration, the video image PC-b/HD-A/B/C is displayed at the sites A, B, and C of the video conference system, as in the Web conference system. In this case, a video loop is avoided without the same video image being repeatedly transferred between the video conference system and the Web conference system.

Figure 6:
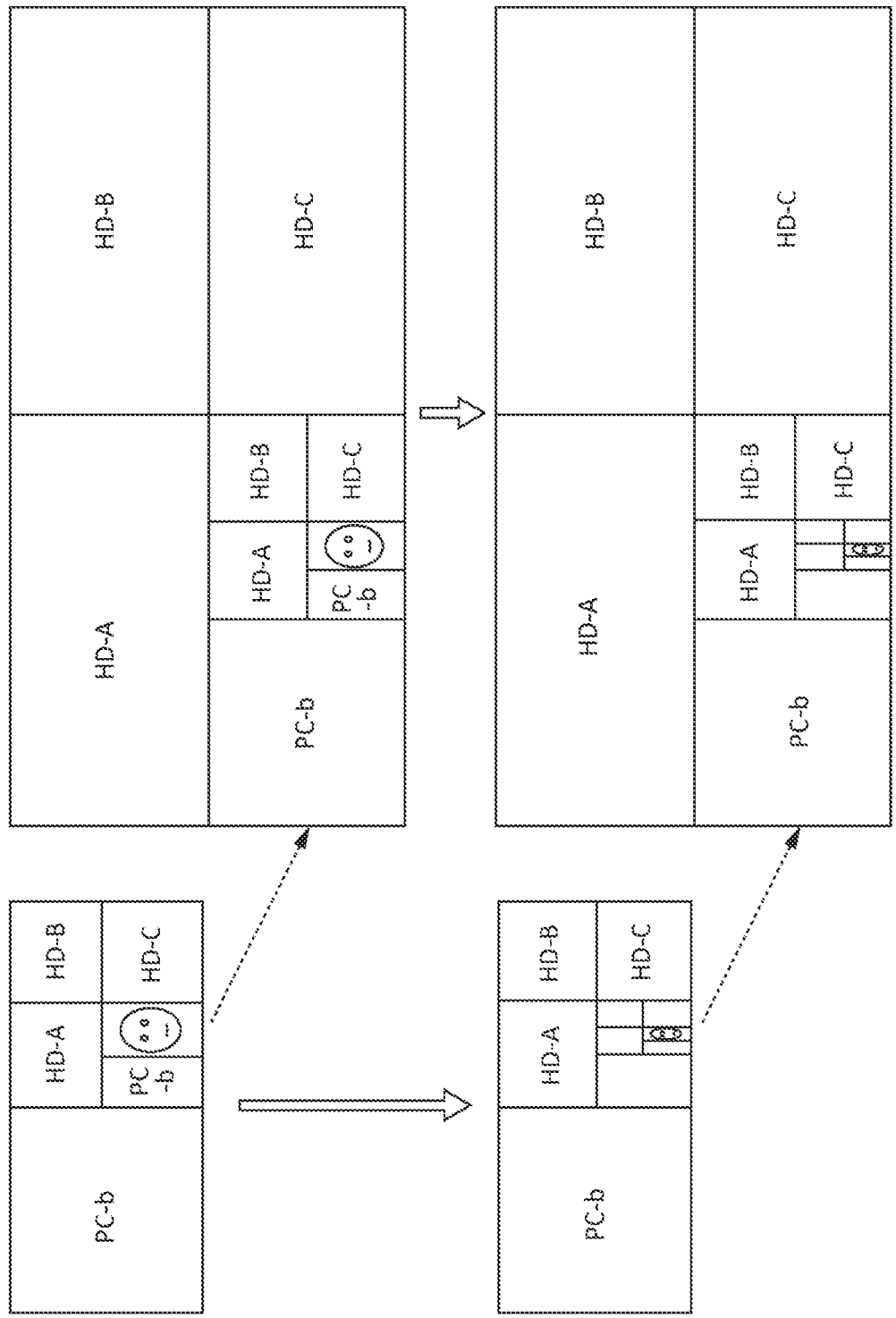
FIG. 6 is a diagram illustrating an example of a display screen in a conference system of a comparative example.

FIG. 6 is a diagram illustrating an example of a display screen in a conference system of a comparative example. This comparative example is an example of a display screen when a combined video image of the video image of the Web conference system and the video image of the video conference system is transferred to the Web conference system. In this comparative example, the video image of the Web conference system and the video image of the video conference system are combined and transmitted to the Web conference system, and the video image is shared between the plurality of conference systems.

Prior to the start of the cooperative operation between the video conference system and the Web conference system, similarly as in the first example described above, the video image PC-a/b obtained by combining the video images PC-a and the PC-b is displayed at the sites a and b of the Web conference system, and the video image HD-A/B/C obtained by combining the video images HD-A, HD-B, and HD-C is displayed at the sites A, B, and C of the video conference system. Immediately after the start of the cooperative operation, at the sites A, B, and C of the video conference system, in addition to the combined video image HD-A/B/C, the combined video image PC-a/b of the Web conference system is combined and displayed.

Thereafter, the combined video image HD-A/B/C/PC-a/b is transferred from the video conference system to the Web conference system, and the combined video image is transferred to the site b as the video image of the site a. For that reason, at the site a of the Web conference system, a video image obtained by combining the video image PC-b and the combined video image HD-A/B/C/PC-a/b is displayed. Furthermore, the combined video image PC-b/HD-A/B/C/PC-a b is transferred from the Web conference system to the video conference system, and as illustrated in the upper part of FIG. 6, the combined video image HD-A/B/C/PC-b/HD-A/B/C/PC-a/b is displayed, and by repeating such transfer of the combined video image, as illustrated in the lower part of FIG. 6, a video image like a mirror in which nesting of a combined video image is repeated is displayed. By repeating such transfer of the combined video image between the video conference system and the Web conference system, a video loop phenomenon occurs.

Figure 7:
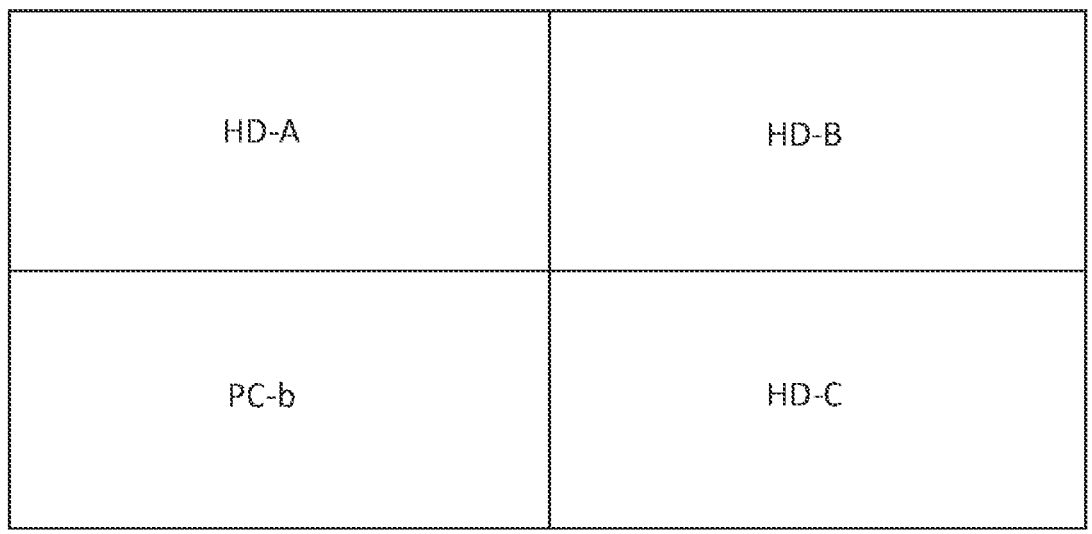
FIG. 7 is a diagram illustrating a second example of the display screen in the conference system according to the first embodiment.

FIG. 7 is a diagram illustrating a second example of a display screen in the conference system according to this embodiment. The second example of the display screen illustrated in FIG. 7 is an example when only the video image b of the Web conference terminal 30b is set to be displayed on the Web conference terminal 30a, and is an example of the display screen corresponding to the operations of S6 to S7 in FIG. 4. In the second example, only the video image b of the Web conference terminal 30b is displayed on the Web conference terminal 30a provided with the relay device 20, and the video image is shared between a plurality of video conference systems.

When the cooperative operation of the video conference system and the Web conference system is started, the video images of the sites A, B, and C of the video conference system and the video image of the site b of the Web conference system are combined and the combined video image HD-A/B/C/PC-b is displayed at the site A. Then, the combined video image HD-A/B/C/PC-b is transferred to the sites B and C and the site b, and displayed at each site. In this case, the combined video image HD-A/B/C is not displayed on the display unit (see FIG. 2) at the Web conference terminal 30a, the combined video image HD-A/B/C is not combined with the video image b by the Web conference terminal 30a, and the same video image is not repeatedly transferred, and thus a video loop is avoided. In a state where the video image of its own site A is not displayed, when a manipulation instruction for display switching is received by a manipulation of a user of the conference participant or the like, the operation may be switched from the operation of the first example described above to the operation of transmitting the combined video image as in the second example. The operation may be switched so as to become a state where the video image of its own site A is not displayed as in the second example by receiving a manipulation instruction of display switching by the manipulation of the user of the conference participant or the like.

Next, transition of a video image data transferred between sites and a display video image displayed at each site when a cooperative operation of a plurality of conference systems is performed will be described using a specific example.

Figure 8A:
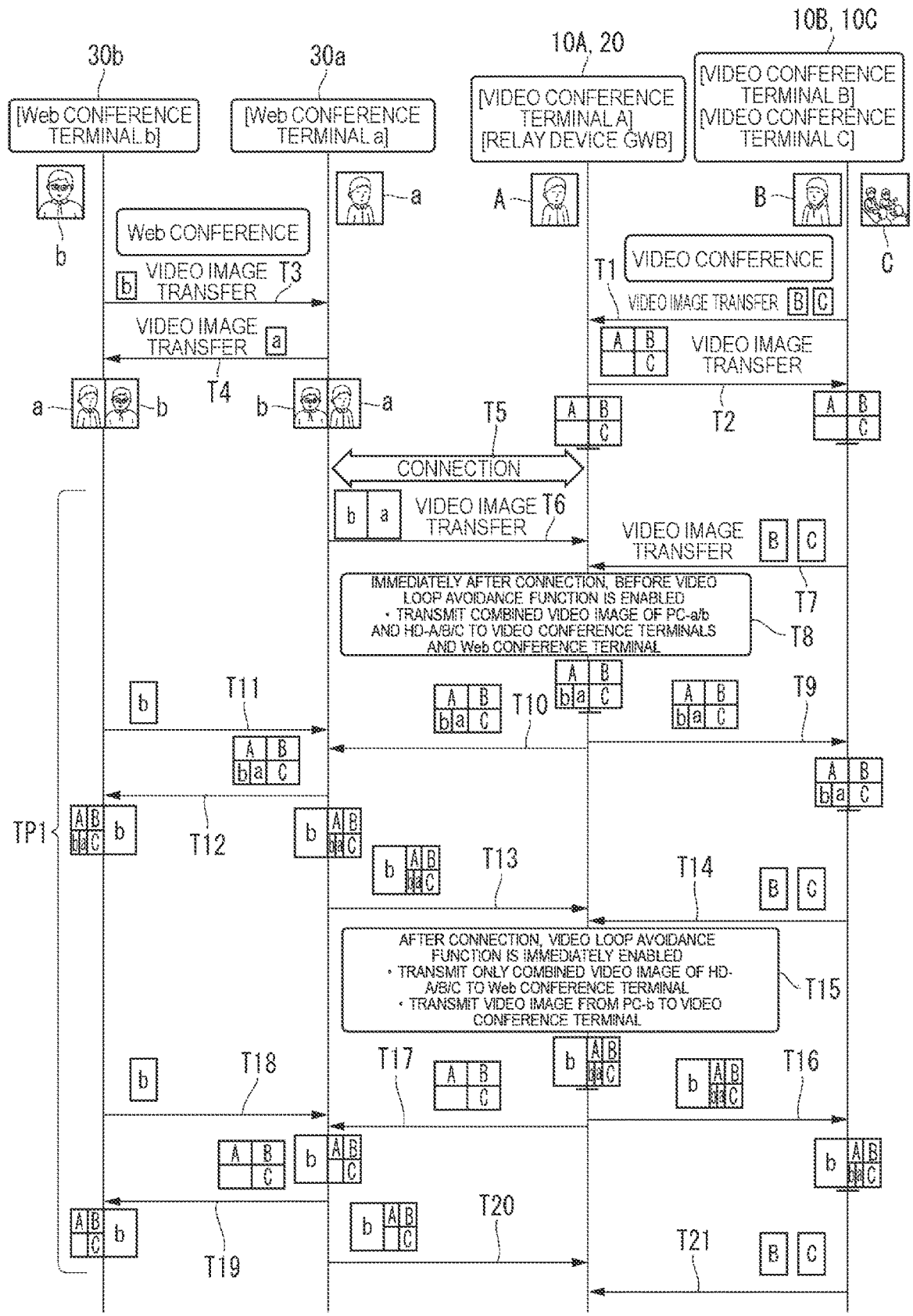
FIG. 8A is a diagram illustrating a first example of video image transfer processing and a display screen during operation in the conference system according to the first embodiment.
Figure 8B:
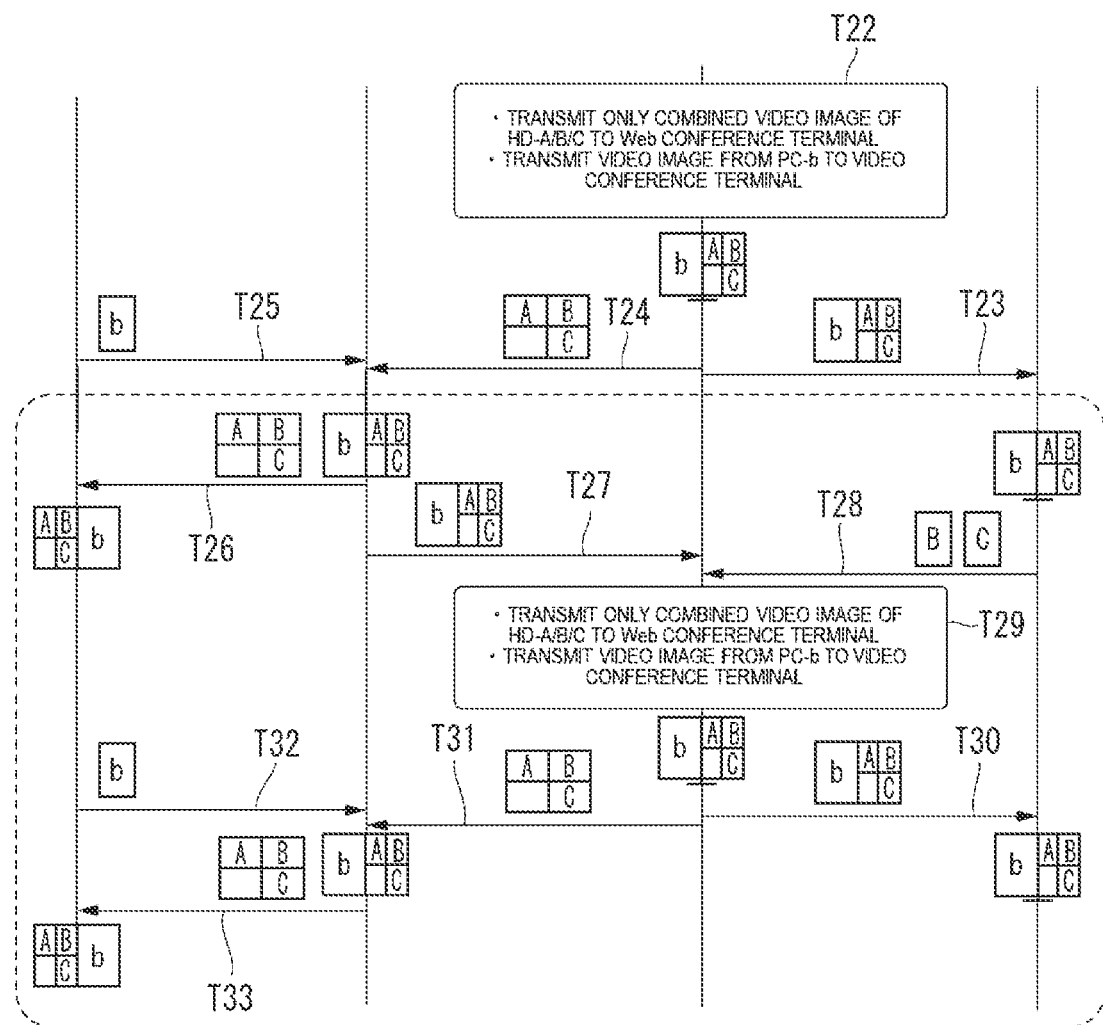
FIG. 8B is another diagram illustrating the first example of the video image transfer processing and the display screen during operation in the conference system according to the first embodiment.

FIGS. 8A and 8B are diagrams illustrating a first example of video image transfer processing and a display screen during operation in the conference system according to this embodiment.

The first example of the video image transfer processing and display screen illustrated in FIGS. 8A and 8B illustrates a sequence in a case where, at the site A where a relay device is provided, only a combined video image of one video conference system is transmitted to another video conference system without combining a video image of its own site A. This first example corresponds to the operations of S1 to S4 in FIG. 4 and the display screen of FIG. 5.

During a single video conference of the video conference systems between the sites A, B, and C, the video conference terminals 10B and 10C transfer the video images B and C of the sites B and C, respectively, and a combined video image of video images A, B, and C is generated at the video conference terminal 10A (T1). The video conference terminal 10A transfers the combined video image HD-A/B/C to the video conference terminals 10B and 10C (T2). With this configuration, the combined video image HD-A/B/C is displayed on the display unit of each of the video conference terminals 10A, 10B, and 10C.

During a single Web conference of the Web conference systems between the sites a and b, the Web conference terminal 30b transfers the video image b of the site b (T3), and the Web conference terminal 30a transfers the video image a of the site a (T4). Then, in each of the Web conference terminals 30a and 30b, the video image of another site is combined, and the combined video image PC-a/b is displayed on the display unit.

Here, when a manipulation instruction for conference cooperation is issued by the user of the conference participant, the relay device 20 connects the video conference terminal 10A of the site A and the Web conference terminal 30a of the site a, and relays a video image and audio data between the video conference system and the Web conference system (T5). With this configuration, the cooperative operation between the two conference systems is started, and the video image and audio data are transferred to each other. In the connection state of the conference system, the Web conference terminal 30a transfers the combined video image PC-a/b of the sites a and b of Web conference to the relay device 20 and the video conference terminal 10A (T6). The video conference terminals 10B and 10C transfer the video images B and C of the sites B and C of the video conference to the relay device 20 and the video conference terminal 10A (T7).

Immediately after the connection between the video conference system and the Web conference system is before the video loop avoidance function is enabled. The relay device 20 and the video conference terminal 10A transfer a combined video image obtained by combining the combined video image PC-a/b and the combined video image HD-A/B/C to the video conference terminals 10B and 10C and the Web conference terminal 30a. (T8). In this case, the combined video image PC-a/b and the combined video image HD-A/B/C are transferred in each of the video conference system and the Web conference system, and the combined video image of the two conference systems is displayed on the display unit of each terminal (T9 to T14).

Immediately after the connection between the video conference system and the Web conference system, the video loop avoidance function is enabled. The relay device 20 and the video conference terminal 10A transfer only the combined video image HD-A/B/C of the video conference system to the Web conference terminal 30a, and transfer the video image sent from the Web conference system side to the counterpart terminal of the video conference system (T15). In this case, the Web conference terminal 30a combines the video image PC-b of the Web conference terminal 30b with the combined video image HD-A/B/C of the video conference system, displays the combined video image on the display unit, and transfers the combined video image to the relay device 20 and the video conference terminal 10A. For that reason, the video image obtained by combining the video image PC-b and the combined video image HD-A/B/C is transferred from the relay device 20 and the video conference terminal 10A to the video conference terminals 10B and 10C, and is displayed on the display unit. In this state, the combined video image HD-A/B/C of the video conference and the video image PC-b of the Web conference are transferred in each of the video conference system and the Web conference system (T16 to T21). As described above, the switching time TP1 until the video loop avoidance function is enabled is executed in a short time, for example, within 1 second. Then, in each of the video conference system and the Web conference system, the transfer of the combined video image HD-A/B/C and the video image PC-b is continuously performed, and the combined video image in a state where the video image of each site does not overlap is displayed on the display unit of each terminal (T22 to T25).

In the connection state between the video conference system and the Web conference system, the operation described above is repeated, and the combined video image HD-A/B/C and the video image PC-b are transferred between the conference systems (T26 to T33). With this configuration, the same video image is not repeatedly transferred, and the combined video image is generated in a state where the video image of each site does not overlap and is displayed on the display unit of each of the Web conference terminals 30a and 30b and the video conference terminals 10A, 10B and 10C, and thus the video loop is avoided.

Figure 9A:
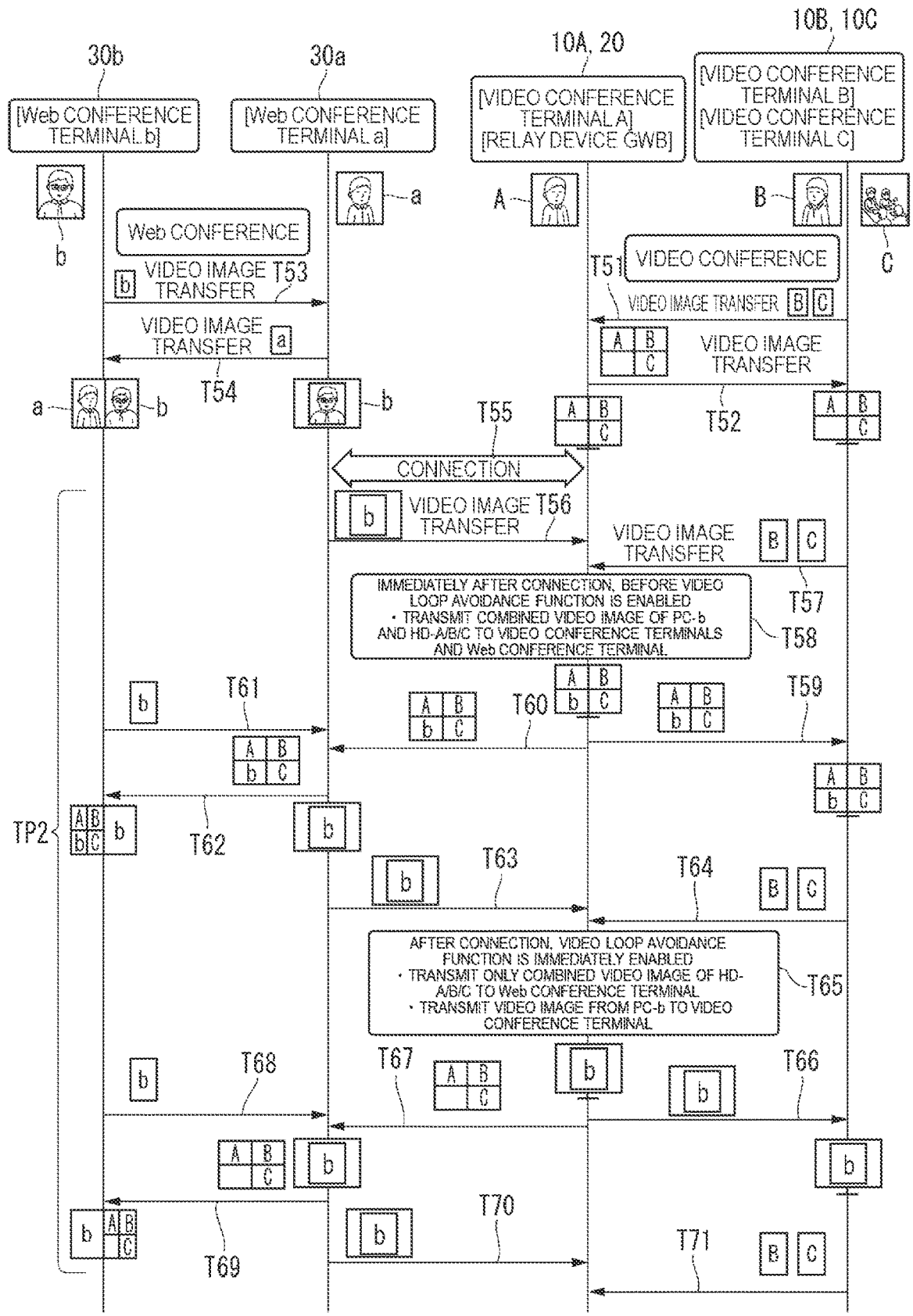
FIG. 9A is a diagram illustrating a second example of the video image transfer processing and the display screen during operation in the conference system according to the first embodiment.
Figure 9B:
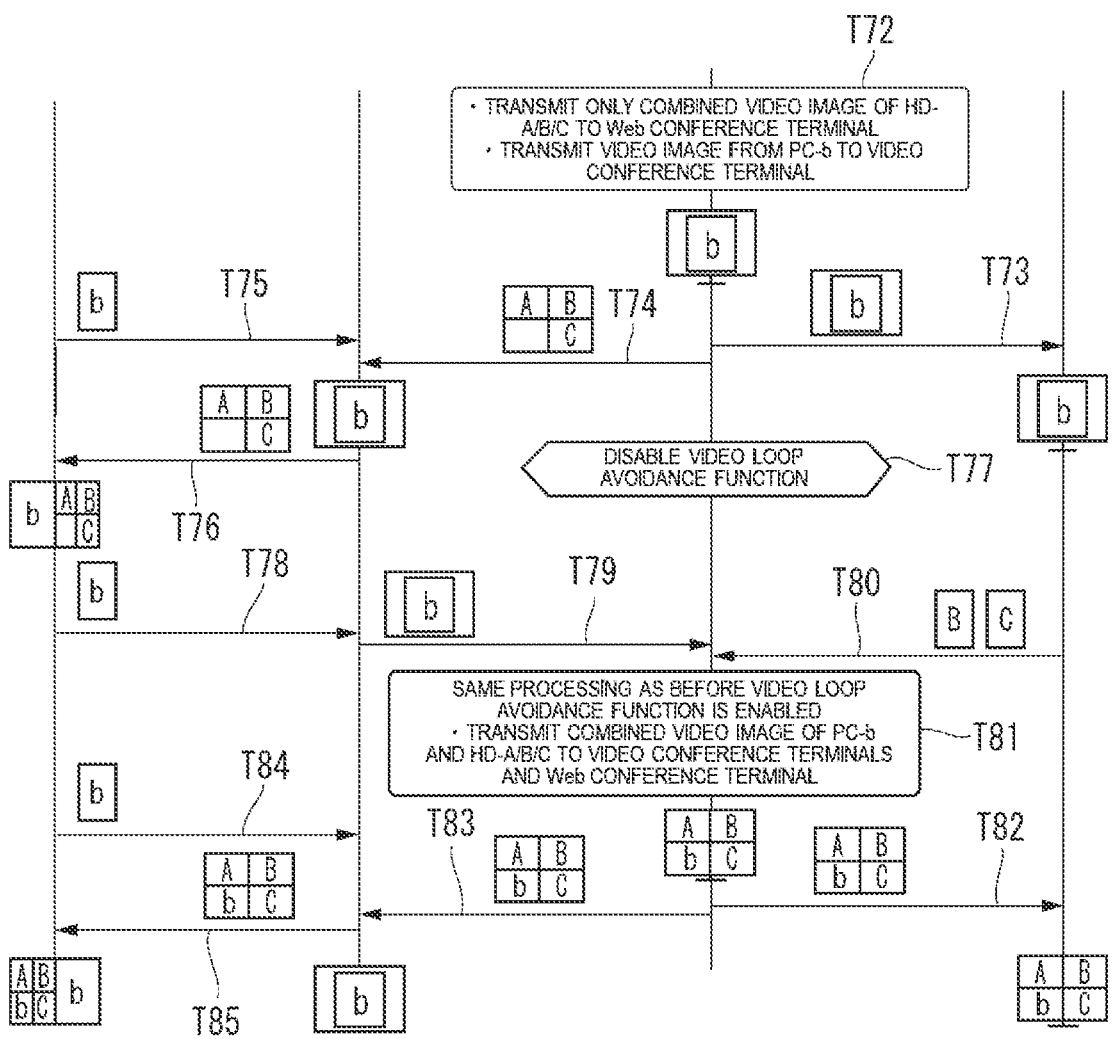
FIG. 9B is another diagram illustrating the second example of the video image transfer processing and the display screen during operation in the conference system according to the first embodiment.

FIGS. 9A and 9B are diagrams illustrating a second example of the video image transfer processing and the display screen during operation in the conference system according to this embodiment.

The second example of the video image transfer processing and the display screen illustrated in FIGS. 9A and 9B is a sequence when an instruction to disable the video loop avoidance function is issued by a manipulation of the user or the like in a state where the video image of its own site A is not displayed at the site A where the relay device is provided. This second example corresponds to the operations of S6 to S7 in FIG. 4 and the display screen of FIG. 7.

Operations (T51 to T54) during a single conference in each of the video conference system and the Web conference system and operations (T55 to T57) when a manipulation instruction for conference coordination is issued by the user of the conference participant are the same as the operations T1 to T7 of the first example illustrated in FIGS. 8A and 8B. In this case, the Web conference terminal 30a is in a state where the video image A (video image a of the site a) of its own site A is not displayed, displays only the video image PC-b of the counterpart terminal is displayed on the display unit, and transfers the video image PC-b to the relay device 20 and the video conference terminal 10A (T56).

Immediately after the connection between the video conference system and the Web conference system is before the video loop avoidance function is enabled. The relay device 20 and the video conference terminal 10A transfer the combined video image obtained by combining the video image PC-b and the combined video image HD-A/B/C to the video conference terminals 10B and 10C and the Web conference terminal 30a (T58). In this case, the video image PC-b and the combined video image HD-A/B/C are transferred in each of the video conference system and the Web conference system, and the combined video image of the two conference systems is displayed on the display unit of each terminal (T59-T64).

Immediately after the connection between the video conference system and the Web conference system, the video loop avoidance function is enabled. The relay device 20 and the video conference terminal 10A transfer only the combined video image HD-A/B/C of the video conference system to the Web conference terminal 30a, and transfer the video image sent from the Web conference system side to the counterpart terminal of the video conference system (T65). In this case, the Web conference terminal 30a displays only the video image PC-b of the counterpart terminal on the display unit, and transfers the video image PC-b to the relay device 20 and the video conference terminal 10A. For that reason, the video image PC-b of the site b of the Web conference is transferred from the relay device 20 and the video conference terminal 10A to the video conference terminals 10B and 10C, and displayed on the display unit. In this state, the combined video image HD-A/B/C of the video conference and the video image PC-b of the Web conference are transferred in each of the video conference system and the Web conference system (T66 to T71). As described above, the switching time TP2 until the video loop avoidance function is enabled is executed in a short time, for example, within 1 second.

Then, the transfer of the combined video image HD-A/B/C and the video image PC-b is continuously performed in each of the video conference system and the Web conference system (T72 to T76). In the second example, the relay device 20 and the video conference terminal 10A transfer the video image PC-b of video conference to the video conference terminals 10B and 10C, and only the video image PC-b of the Web conference is displayed on the display unit of each terminal of the video conference system.

In this state, for example, when an instruction to disable the video loop avoidance function is issued by the manipulation of the user of the conference participant and the manipulation instruction for display switching for the conference video image is received (T77), the relay device 20 and the video conference terminal 10A disable the video loop avoidance function. In this case, the relay device 20 and the video conference terminal 10A transfer the combined video image obtained by combining the video image PC-b and the combined video image HD-A/B/C to the video conference terminals 10B and 10C and the Web conference terminal 30a in the same manner as before the video loop avoidance function is enabled (T81). In this case, the combined video image HD-A/B/C of the video conference and the video image PC-b of the Web conference are transferred in each of the video conference system and the Web conference system, and the combined video image of the two conference systems is displayed on the display unit of each terminal (T78 to T85). In the second example, even in a state where the video loop avoidance function is disabled, the same video image at the site A is not repeatedly transferred. Accordingly, the combined video image is generated in a state where the video of each site does not overlap and is displayed on the display unit of each of the Web conference terminals 30a and 30b and the video conference terminals 10A, 10B and 10C, and thus the occurrence of the video loop phenomenon is prevented.

Figure 10:
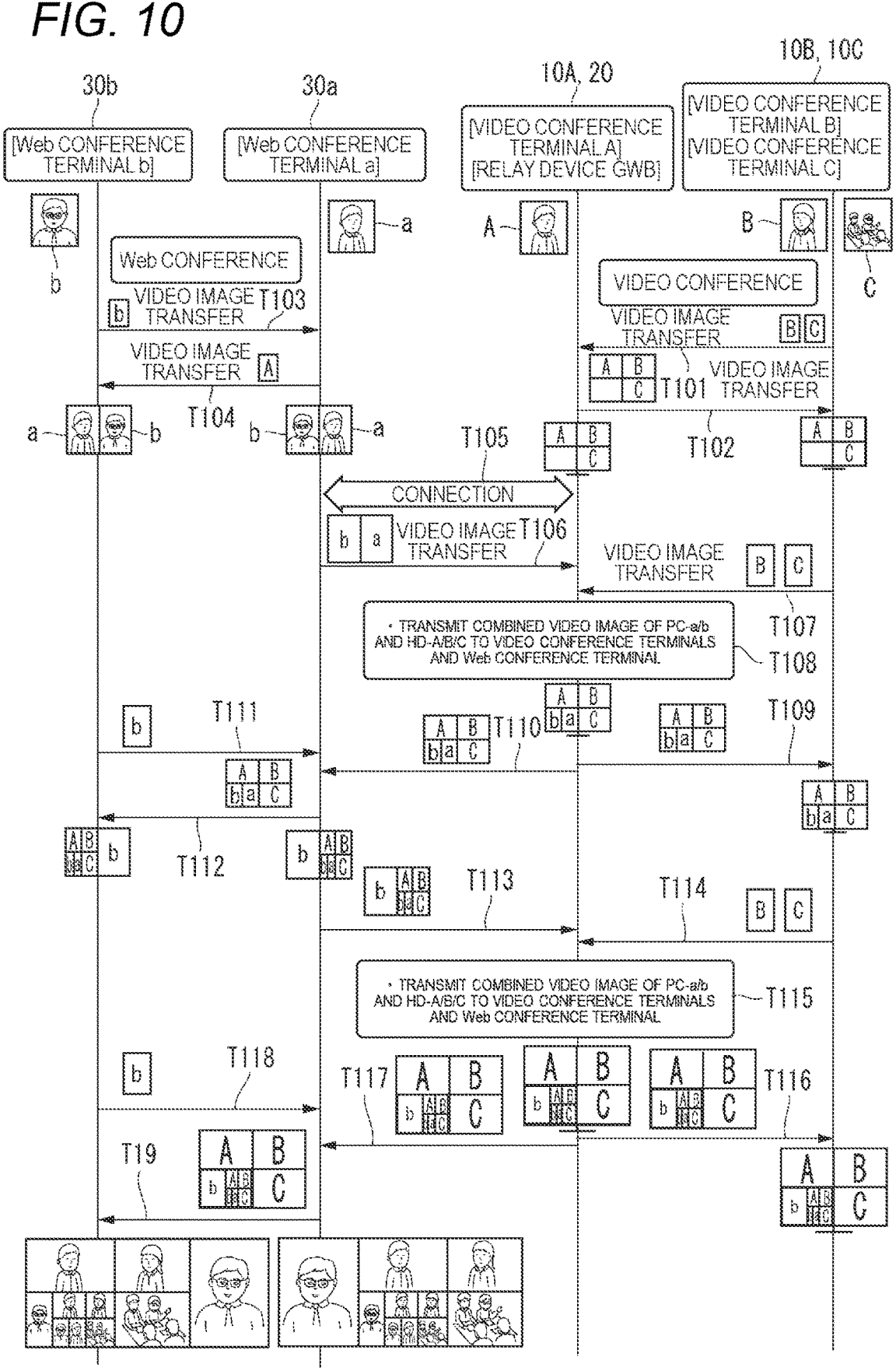
FIG. 10 is a diagram illustrating an example of video image transfer processing and a display screen during operation a conference system of a comparative example.

FIG. 10 is a diagram illustrating an example of video image transfer processing and a display screen during operation in the conference system of the comparative example.

The comparative example illustrated in FIG. 10 illustrates a sequence in a case where, at the site A where the relay device is provided, the video image of its own site A and the video image of another site are combined and displayed on the display unit and the combined video image is transferred to the other site, and corresponds to the display screen of FIG. 6.

Operations (T101 to T104) during a single conference in each of the video conference system and the Web conference system and operations (T105 to T107) when a manipulation instruction for conference coordination is issued by the user of the conference participant are the same as the operations T1 to T7 of the first example illustrated in FIGS. 8A and 8B.

The relay device 20 and the video conference terminal 10A transfer a combined video image obtained by combining the combined video image PC-a/b and the combined video image HD-A/B/C to the video conference terminals 10B and 10C and the Web conference terminal 30a (T108). In this case, the combined video image PC-a/b and the combined video image HD-A/B/C are transferred in each of the video conference system and the Web conference system, and the combined video image of the two conference systems is displayed on the display unit of each terminal (T109 to T114).

In the connection state between the video conference system and the Web conference system, the operation described above is repeated, and the transfer of the combined video image HD-A/B/C and the video image PC-a/b continues in each of the video conference system and the Web conference system (T115 to T119). In the case of the comparative example, the process of combining and transferring the combined video image HD-A/B/C and the video image PC-a/b is repeated, the same video image is repeatedly transferred to cause a phenomenon of a video loop, and a video image like a mirror with repeated nesting of the combined video image is displayed.

As described above, in this embodiment, the relay device 20 transmits only the combined video image of the video images at the respective sites A, B, and C of the video conference system to the Web conference terminal 30a, and transmits the video image sent from the another site b of the Web conference system that does not include the sites A and a where the relay device 20 is provided to the video conference terminal 10A. With this configuration, it is possible to suppress that the same video image at their own sites A and a is repeatedly transferred between a plurality of conference systems. For that reason, a video loop can be avoided, an appropriate video image display screen can be obtained at each site, and a smooth video conference can be executed by sharing a conference video image between the sites. Accordingly, it is possible to improve a display mode when sharing a conference video by making a plurality of video conference systems cooperate with each other.

As described above, the conference system of this embodiment includes the video conference system MS1 as an example of the first conference system and the Web conference system MS2 as an example of the second conference system. The conference system of this embodiment includes the video conference terminal 10A as a first terminal for transmitting and receiving video image data acquired at the site of the video conference system MS1 and the Web conference terminal 30a as a second terminal for transmitting and receiving video image data acquired at the site of the Web conference system MS2. The conference system of this embodiment includes the relay device 20 as a relay unit that mutually transfers data between the video conference terminal 10A and the Web conference terminal 30a, transmits the first video image data to the Web conference terminal 30a, and transmits the second video image data to the video conference terminal 10A. The relay device 20 transmits only the combined video image of the video image at the respective sites of the video conference system to the Web conference terminal 30a as the first video image data, and transmits the video image sent from the Web conference terminal 30a to the video conference terminal 10A as the second video image data. With this configuration, a video loop is avoided without the same video image being transferred repeatedly between a plurality of conference systems.

In this embodiment, the video conference terminal 10A transmits a combined video image obtained by combining video images at a plurality of sites of the video conference system MS1 to the video conference terminals 10B and 10C as third terminals provided at the respective sites of the video conference system, and transmits the second video image data sent from the relay device 20 to the video conference terminals 10B and 10C at the respective sites of the video conference system MS1 when transferring data to the Web conference terminal 30a by the relay device 20. With this configuration, the same video image is not repeatedly transferred, and the combined video image is generated in a state where the video image of each site does not overlap and is displayed on each terminal. For that reason, it is possible to prevent the occurrence of the video loop phenomenon in which the video image like a mirror with repeated nesting of the combined video image is displayed.

In the first embodiment, the Web conference terminal 30a transmits the video image at its own site of the Web conference system MS2 to the Web conference terminal 30b as a fourth terminal provided at another site of the Web conference system, and combines the video image of the first video image data sent from the relay device 20 with the video image at its own site, displays the combined video image on the display unit, and transmits the video image of the first video image data to the Web conference terminal 30b at another site of the Web conference system MS2, when transferring data to the video conference terminal 10A by the relay device 20. With this configuration, the same video image is not repeatedly transferred, and the combined video image is generated in a state where the video image of each site does not overlap and is displayed on each terminal. For that reason, it is possible to prevent the occurrence of the video loop phenomenon in which the video image like a mirror with repeated nesting of the combined video image is displayed.

The video conference apparatus according to this embodiment includes the relay device 20 that transmits the video image data acquired at the site of the first conference system (video conference system MS1) to the Web conference terminal 30a as a second terminal provided in the second conference system (Web conference system MS2), and transmits the video image data of the second conference system to the video conference terminal 10A as the first terminal provided in the first conference system. The video conference apparatus is configured as, for example, a video conference terminal 10a including the functions of the video conference terminal 10A and the relay device 20. The relay device 20 transmits only the combined video image of the video images at the respective sites of the video conference system MS1 to the Web conference terminal 30a as the first video image data, and transmits the video image sent from the Web conference terminal 30a as the second video image data to the video conference terminal 10A. With this configuration, a video loop is avoided without the same video image being transferred repeatedly between a plurality of conference systems.

Second Embodiment

Figure 11:
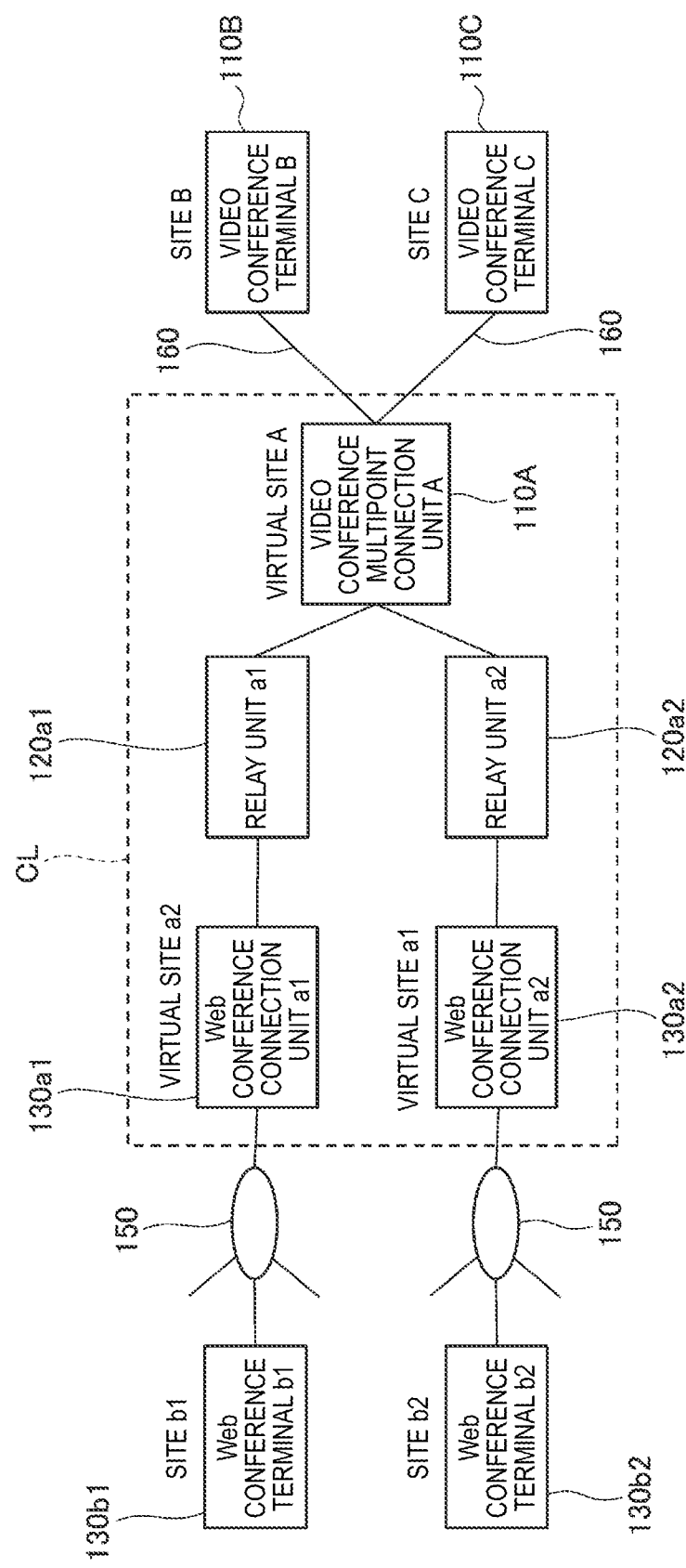
FIG. 11 is a block diagram illustrating an example of a schematic configuration of a conference system according to a second embodiment.

FIG. 11 is a block diagram illustrating an example of a schematic configuration of a conference system according to a second embodiment. Since the description of the same or equivalent portion as that of the first embodiment described above is duplicated, the description may be omitted or simplified by adding the same or equivalent reference numerals to the drawings.

In the above-described example of the first embodiment, each function of the video conference terminal as an example of the first terminal, the relay device as an example of the relay unit, and the Web conference terminal as an example of the second terminal is provided by a physical configuration mechanically realized by hardware. On the other hand, in the second embodiment, the functions of these devices are realized by software such as a program in a management terminal device CL (described later) as a server computer, and a configuration in that case is exemplified.

As illustrated in FIG. 11, in the second embodiment, a site A is not provided as a physical site, but is a virtual site (hereinafter, also referred to as the "virtual site A") that is logically or virtually provided on software (for example, Internet space). The same applies to sites a1 and a2, which are the same sites as site A (hereinafter, each is also referred to as the "virtual site a1" or the "virtual site a2"). In the second embodiment, one management terminal device CL is logically installed across the virtual sites A, a1, and a2. In other words, the management terminal device CL is configured to logically include these virtual sites A, a1 and a2.

Figure 14:
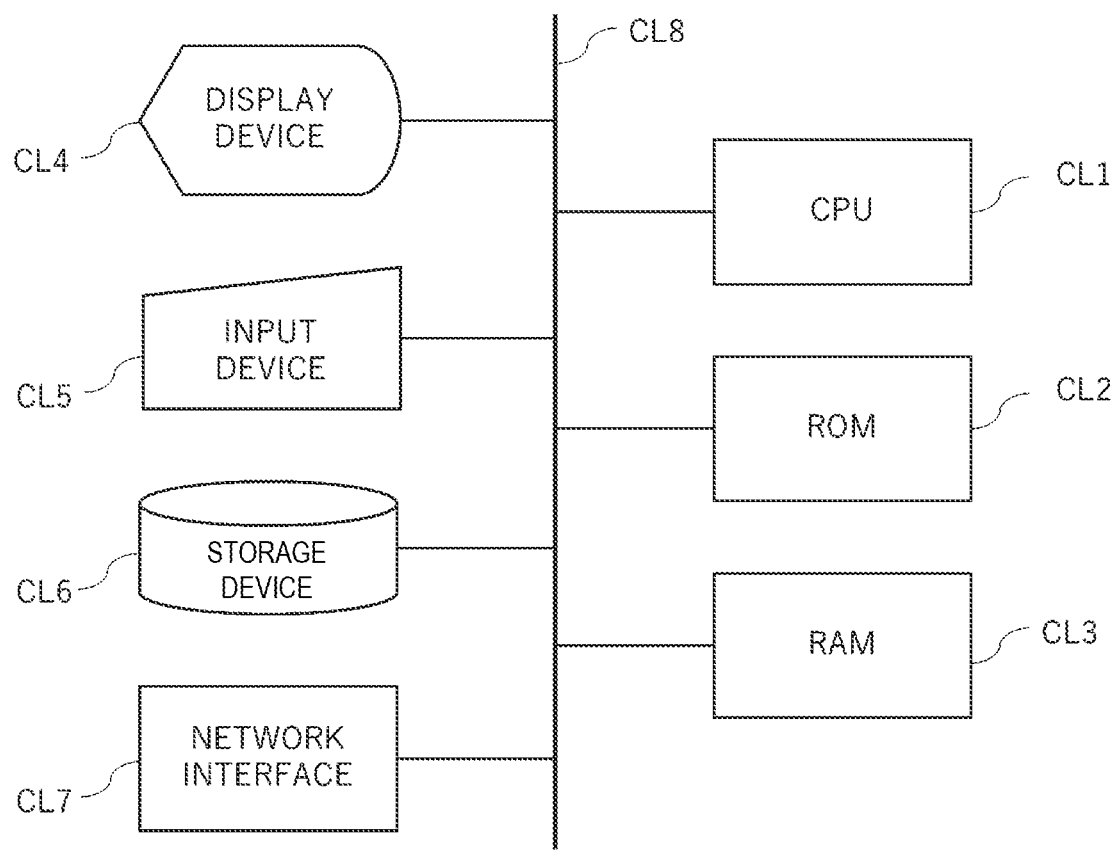
FIG. 14 is a block diagram illustrating an example of a server computer for the cloud in the conference system according to the second embodiment.

The management terminal device CL is configured of a dedicated device for a so-called server computer for the cloud in terms of hardware. A program that is stored and held as software in a storage unit such as the read only memory (ROM) or random access memory (RAM) of the specialized computer is executed by a signal processing unit (described later) such as the central processing unit (CPU) to realize various functions. The management terminal device CL is not limited to the dedicated server computer described above, and may be configured by, for example, a general-purpose computer such as a desktop computer or a laptop computer. Further, in the second embodiment, the management terminal device is configured of a single computer, but is not limited to thereto, and may be configured of a plurality of computers. FIG. 14 is a block diagram illustrating an example of the server computer for the cloud in the conference system according to the second embodiment. The server computer includes a central processing unit (CPU) CL1, a read only memory (ROM) CL2, a random access memory (RAM) CL3, a display device CL4, an input device CL5, a storage device CL6, and a network interface CL7 which are connected to a bus CL8. The central processing unit CL1 reads and executes a software program that realizes each function from the read only memory CL2. Values and the like generated in arithmetic processing are temporarily written in the random access memory CL3. The display device CL4 is, for example, a liquid crystal monitor, and displays the result of processing executed by the server computer. As the input device CL5, for example, a keyboard, a mouse, or the like is used, and a predetermined operation input can be performed. As the storage device CL6, for example, a hard disk drive, a solid state drive, an optical disk, a non-volatile memory, or the like is used. A program allowing an operating system and a server computer to function is also recorded in the storage device CL6. As the network interface CL7, for example, a network interface card or the like is used, and various data can be transmitted and received between devices via a local area network, a wide area network, and the like. For example, the central processing unit CL1, the read only memory CL2, the random access memory CL3, and the storage device CL6 realize functions of signal processing units 112, 122a1, and 132a1 which are described later, and the network interface CL7 realizes functions of communication units 111 and 131a1 which are described later.

The management terminal device CL has, as a function realized by software, a video conference multipoint connection unit A (110A) (hereinafter, also referred to as the "video conference multipoint connection unit 110A") as an example of a first transmission/reception unit, a relay unit a1 (120a1) (hereinafter, also referred to as the "relay unit 120a1") and a relay unit a2 (120a2) (hereinafter, also referred to as the "relay unit 120a2") as an example of a relay unit, a Web conference connection unit a1 (130a1) (hereinafter, also referred to as the "Web conference connection unit 130a1") and a Web conference connection unit a2 (130a2) (hereinafter, also referred to as "Web conference connection unit 130a2") as an example of a second transmission/reception unit. The Web conference connection unit a1 is logically provided at the virtual site a1 described above, and the Web conference connection unit a2 is provided at the virtual site a2 described above.

The video conference multipoint connection unit 110A of the management terminal device CL is installed at the virtual site A, and is connected to each of a video conference terminal 110B and a video conference terminal 110C as an example of a third transmission/reception unit via a communication line 160. The video conference terminal 110B is installed at the physically provided site B according to the first embodiment, and the video conference terminal 110C is also installed at the physically provided site C according to the first embodiment. The video conference multipoint connection unit 110A of the management terminal device CL acquires and combines the video of the terminal at each site as a management terminal, and transfers the combined video image of a plurality of sites to the video conference terminals 110B and 110C at other sites. That is, in the second embodiment, a video conference system MS11 as an example of the first conference system is configured to include the video conference multipoint connection unit 110A, the video conference terminal 110B, the video conference terminal 110C, and the communication line 160.

The relay unit 120a1 of the management terminal device CL is connected to each of the video conference multipoint connection unit 110A and the Web conference connection unit 130a1 of the management terminal device CL by software. Similarly, the relay unit 120a2 of the management terminal device CL is also connected to each of the video conference multipoint connection unit 110A and the Web conference connection unit 130a2 by software. The video conference multipoint connection unit 110A of the management terminal device CL is connected to the Web conference connection units 130a1 and 130a2 of the management terminal device CL via the relay units 120a1 and 120a2 of the management terminal device CL, respectively, that is, the relay units 120a1 and 120a2 of the management terminal device CL connect and cooperate with the video conference system MS11 and the Web conference system MS12.

Further, in the second embodiment, a plurality (two in the second embodiment) of networks 150 are provided, and the Web conference terminal b1 (130b1) (hereinafter, also referred to as the "Web conference terminal 130b1") of the management terminal device CL is physically installed at the site b1 on one side of the network 150. The Web conference connection unit 130a1 of the management terminal device CL is connected to the Web conference terminal 130b1 as an example of the fourth transmission/reception unit via one of the networks 150. A Web conference terminal b2 (130b2) (hereinafter, also referred to as "Web conference terminal 130b2") is physically installed at the site b2 on the other side of the network 150. The Web conference connection unit 130a2 of the management terminal device CL is connected to the Web conference terminal 130b2 as an example of a fourth transmission/reception unit via the other network 150.

The Web conference connection units 130a1 and 130a2 of the management terminal device CL transfer the video image and audio data of the other sites to the terminals of the other sites, thereby making video image and audio shareable at each site between the terminals in the network 150 of the Web conference system MS12. That is, in the second embodiment, the Web conference system MS12 as an example of the second conference system is provided differently from the video conference system MS11 as an example of the first conference system, and is configured to include the Web conference terminals 130b1 and 130b2, and network 150. Further, the network 150 uses an IP network constructed in, for example, a public data communication network such as the Internet, and is provided differently from a communication protocol of the video conference system MS12.

In the second embodiment, the relay units 120a1 and 120a2 of the management terminal device CL transfers the video image and audio data of the video conference system MS12 acquired by the video conference multipoint connection unit 110A as an example of the first video image data to the Web conference connection units 130a1 and 130a2 of the management terminal device CL. Further, each of the relay units 120a1 and 120a2 of the management terminal device CL transfers the video image and audio data of the Web conference system MS12 acquired by the Web conference connection units 130a1 and 130a2 as an example of the second video image data to the video conference multipoint connection unit 110A of the management terminal device CL. The video conference multipoint connection unit 110A of the management terminal device CL transfers the video image and audio data of the Web conference system transferred from each of the Web conference connection units 130a1 and 130a2 of the management terminal device CL via each of the relay units 120a1 and 120a2 of the management terminal device CL to the video conference terminal 110B and the video conference terminal 110C of another site as an example of the third terminal. Each of the Web conference connection units 130a1 and 130a2 of the management terminal device CL transfers the video image and audio data of the video conference system MS11 transferred from the video conference multipoint connection unit 110A via each of the relay units 120a1 and 120a2 of the management terminal device CL to each of the Web conference terminals 130b1 and 130b2 of another site as an example of the fourth terminal. With this configuration, the video image and audio can be mutually shared between a plurality of conference systems of the video conference system MS11 and the Web conference system MS12. That is, in the second embodiment, the management terminal device CL conceptually functions as a cooperating unit CN referred to in the first embodiment.

Figure 12A:
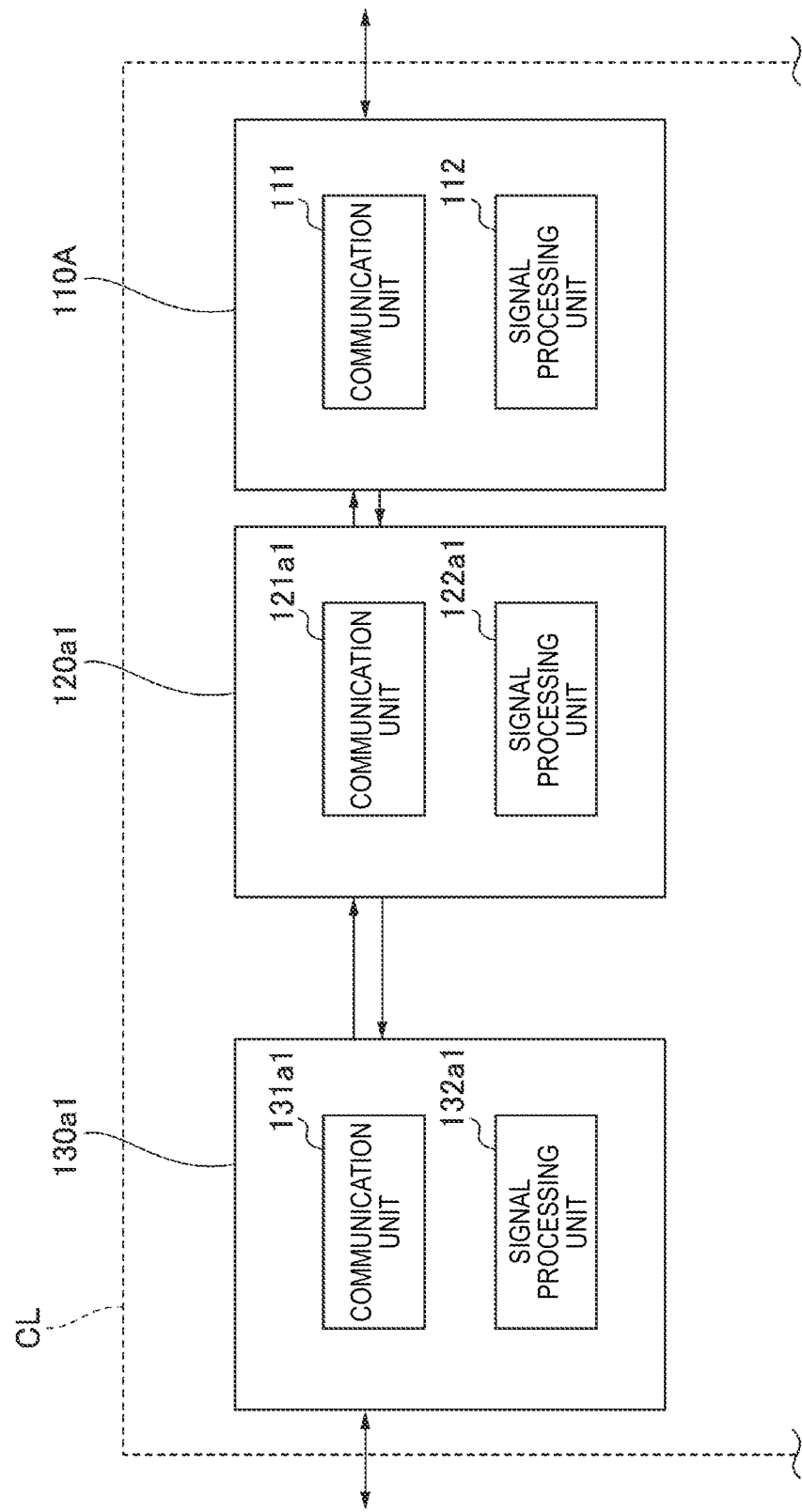
FIG. 12A is a block diagram illustrating a functional configuration of a device in the conference system according to the second embodiment.
Figure 12B:
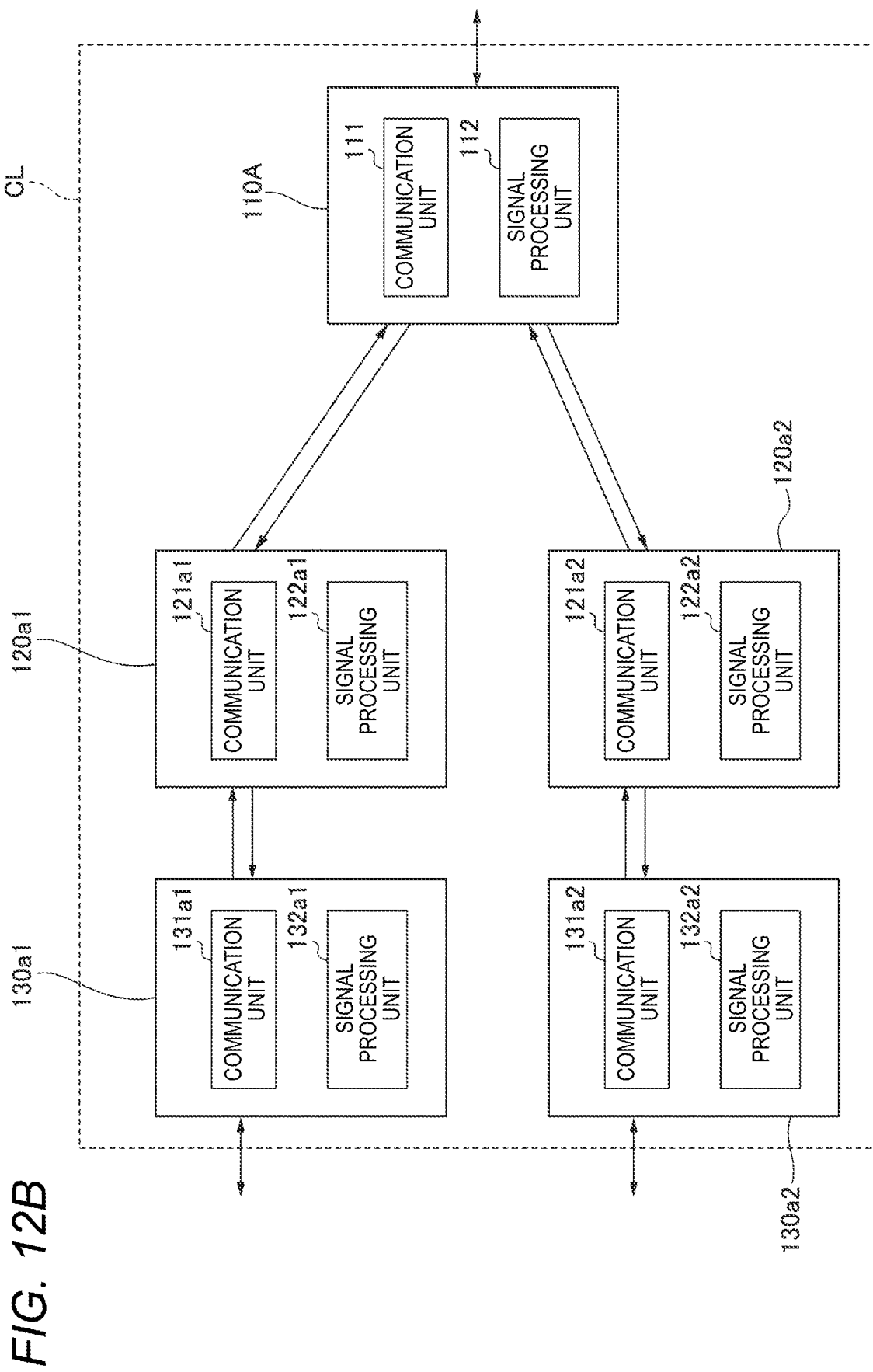
FIG. 12B is a block diagram illustrating a functional configuration of a device in the conference system according to the second embodiment.

FIGS. 12A and 12B are block diagrams illustrating a functional configuration of a device in the conference system according to the second embodiment.

As illustrated in FIGS. 12A and 12B, the video conference multipoint connection unit 110A of the management terminal device CL includes a communication unit 111 and a signal processing unit 112. The communication unit 111 of the video conference multipoint connection unit 110A includes a communication interface and communicates with terminals at other sites of the video conference system MS11 and each of the relay units 120a1 and 120a2 of the management terminal device CL, and transmits and receives the video image and audio data, as well as control data. The signal processing unit 112 of the video conference multipoint connection unit 110A executes signal processing such as encoding and decoding of video image and audio data, video image combining, and video image division.

Each of the relay units 120a1 and 120a2 has communication units 121a1 and 121a2, and signal processing units 122a1 and 122a2. Each of the communication units 121a1 and 121a2 of the relay units 120a1 and 120a2 includes a communication interface, and communicates with each of the video conference multipoint connection unit 110A and the Web conference connection units 130a1 and 130a2 of the management terminal device CL, and transmits and receives the video image and audio data, and control data. Each of the signal processing units 122a1 and 122a2 of the relay units 120a1 and 120a2 executes signal processing such as encoding and decoding of video image and audio data, video image combining, and video image division.

Each of the Web conference connection units 130a1 and 130a2 includes a communication unit 131 and a signal processing unit 132. Each of the communication units 131a1 and 131a2 of the Web conference connection units 130a1 and 130a2 includes a communication interface, and communicates with the terminals of other sites of the Web conference system and each of the relay units 120a1 and 120a2, and transmits and receives the video image and audio data, and the control data. Each of the signal processing units 132a1 and 132a2 of the Web conference connection units 130a1 and 130a2 executes signal processing such as encoding and decoding of video image and audio data, video image combining, and video image division.

Figure 13A:
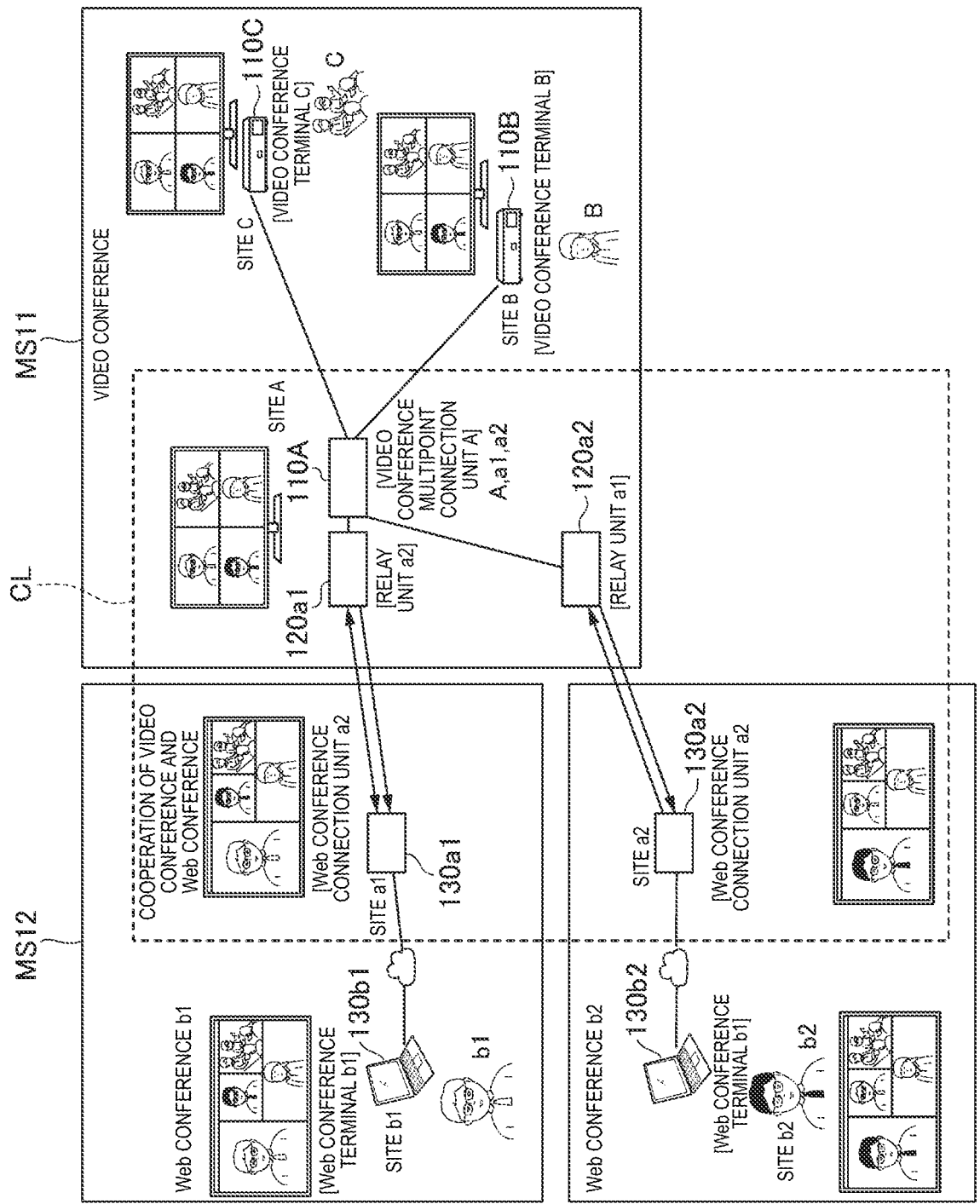
FIG. 13A is a diagram illustrating a first example during operation in the conference system according to the second embodiment.
Figure 13B:
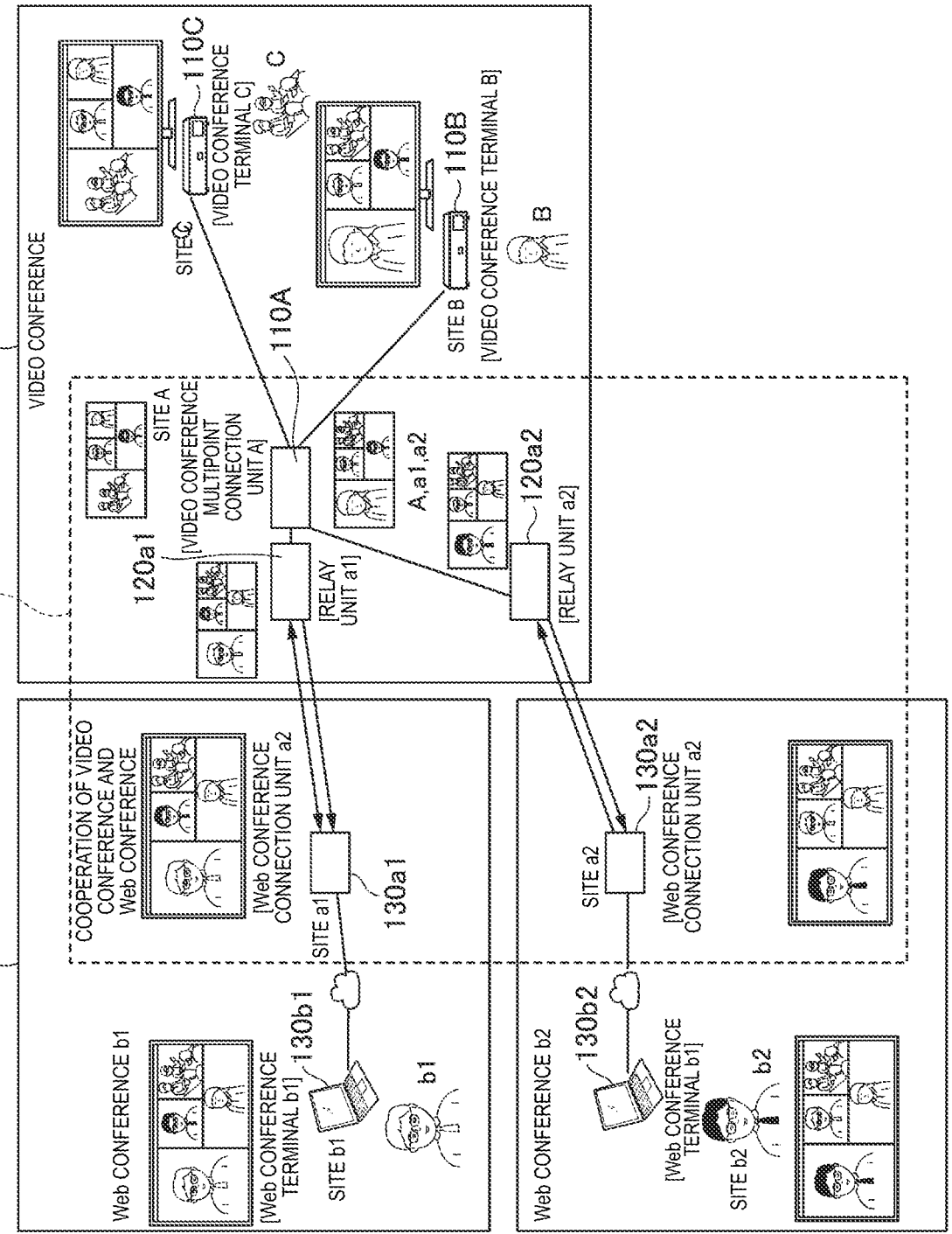
FIG. 13B is a diagram illustrating a second example during operation in the conference system according to the second embodiment.

FIG. 13A is a diagram illustrating a first example during operation in the conference system according to the second embodiment. FIG. 13B is a diagram illustrating a second example during operation in the conference system according to the second embodiment.

In the second embodiment, the function (see FIG. 3) of the cooperating unit CN referred to in the first embodiment is realized by the management terminal device CL. The management terminal device CL is provided, for example, on the cloud and as a system configuration for cooperating a plurality of conference systems, connects the video conference system MS11 and the Web conference system MS12, and relays the video image and audio data by relaying the two conference systems.

At the site B of the video conference system MS11, the video image B of the conference participant at the site B is imaged, acquired in the video conference terminal 110B, and transferred to the video conference multipoint connection unit 110A of the management terminal device at the virtual site A. At the site C of the video conference system MS11, the video image C of the conference participant at the site C is imaged and acquired in the video conference terminal 110C, and transferred to the video conference multipoint connection unit 110A of the management terminal device at the virtual site A. As described above, the virtual site A and the sites a1 and a2 are logically provided sites, and no video image is generated because imaging is not performed. In the second embodiment, the virtual sites A, a1, and a2 function as cooperating points as cooperating units of the management terminal device CL.

The video conference multipoint connection unit 110A of the management terminal device CL performs a process of combining the video image B and the video image C of the two sites, and transmits the generated combined video image BC to the video conference terminal 110B of the site B and the video conference terminal 110C of the site C. The video conference terminal 110B at the site B and the video conference terminal 110C at the site C each receive the combined video image BC and display the combined video image BC on the display unit of their own terminal. With this configuration, in each of the sites B and C, each combined video image BC is displayed on the display unit, and the video image of each site during the conference is shared.

Further, the video conference multipoint connection unit 110A of the management terminal device CL outputs the combined video image BC of the video conference system to the relay units 120a1 and 120a2 of the management terminal device CL, respectively. Each of the relay units 120a1 and 120a2 of the management terminal device CL transmits the combined video image BC acquired from the video conference multipoint connection unit 110A of the management terminal device CL to the Web conference connection units 130a1 and 130a2. On the other hand, at the site b1 of the Web conference system MS2, the video image b1 of the conference participant at the site b1 is imaged, acquired in the Web conference terminal 130b1, and transferred to the Web conference connection unit 130a1 at the virtual site a1. Similarly, at the site b2 of the Web conference system MS2, the video image b2 of the conference participant at the site b2 is imaged, acquired in the Web conference terminal 130b2, and transferred to the Web conference connection unit 130a2 of the virtual site a2.

In a case where the video conference system MS11 and the Web conference system MS12 are connected and made to cooperate with each other by the relay units 120a1 and 120a2 of the management terminal device CL, respectively, each of the relay units 120a1 and 120a2 of the management terminal device CL transmits the combined video image of the video conference system MS11 to each of the Web conference connection units 130a1 and 130a2. Each of the Web conference connection units 130a1 and 130a2 of the management terminal device CL inputs the combined video image BC transferred from the relay units 120a1 and 120a2 of the management terminal device CL, and transmits the combined video image BC to each of the Web conference terminals 130b1 and 130b2 of the other sites b1 and b2.

Further, each of the Web conference terminals 130b1 and 130b2 transmits the video images b1 and b2 of the own sites b1 and b2 to the Web conference connection units 130a1 and 130a2 of the virtual sites a1 and a2, respectively, and combines the video images b1 and b2 of the own sites b1 and b2, and the combined video image BC transferred from each of the other sites a1 and a2 to be displayed on the display unit.

Here, in the second embodiment, when each of the relay units 120a1 and 120a2 of the management terminal device CL transmits from the video conference multipoint connection unit 110A to the Web conference connection units 130a1 and 130a2 on the Web conference system side, as the first video image data, only the combined video image BC of each of the sites B and C of the video conference system is transferred. Then, each of the relay units 120a1 and 120a2 of the management terminal device CL transfers the combined video image BC from the Web conference connection units 130a1 and 130a2 to each of the Web conference terminals 130b1 and 130b2 of the other sites b1 and b2 in the Web conference system MS12.

Further, when transmitting from the Web conference connection units 130a1 and 130a2 of the management terminal device CL to the video conference multipoint connection unit 110A on the video conference system MS11 side, each of the relay units 120a1 and 120a2 of the management terminal device CL transfers the video image sent from each of the Web conference connection units 130a1 and 130a2 is transmitted, as the second video image data. Then, each of the relay units 120a1 and 120a2 of the management terminal device CL transfers the video image to the video conference terminals 110B and 110C of the sites B and C at the video conference multipoint connection unit 110A of the management terminal device CL.

That is, in the first example illustrated in FIG. 13A as one of the specific examples, at the virtual site A, the video images B and C of the own sites from the sites B and C are combined to generate the combined video image BC, and a combined video image HD-B/C/PC-b1/b2 is further generated in which each of the video images b1 and b2 from the sites b1 and b2 is also combined with respect to the combined video image BC. The combined video image HD-B/C/PC-b1/b2 is transferred and displayed to the video conference terminals 110B and 110C of the sites B and C, respectively. Further, a combined video image HD-B/C/PC-b2 in which the video image b2 from the site b2 is combined with the combined video image BC is also further generated at the virtual site A. The combined video image HD-B/C/PC-b2 is transferred and displayed to the Web conference terminal 130b1 of the site b1 through the virtual sites A and a1. Further, the combined video image HD-B/C/PC-b1 in which the video image b1 from the site b1 is combined with the combined video image BC is also further generated at the virtual site A. The combined video image HD-B/C/PC-b1 is transferred and displayed to the Web conference terminal 130b1 of the site b2 through the virtual sites A and a2.

Then, in the first example illustrated in FIG. 13A, at the site b1, the combined video image HD-B/C/PC-b2 from the virtual site a1 is disposed in the right half of the display screen of the Web conference terminal 130b2, and the video image b1 at the own site of the site b1 is combined and displayed in a state where of being disposed in the remaining left half. On the other hand, at the site b2, the combined video image HD-B/C/PC-b1 from the virtual site a2 is disposed in the right half of the display screen of the Web conference terminal 130b2, and the video image b2 at the own site of the site b2 is combined and displayed in the state of being disposed in the remaining left half.

Further, as another specific example, in the second example illustrated in FIG. 13B, at the virtual site A, the video images B, b1, and b2 from the respective sites from the sites B, b1, and b2 are combined to generate the combined video image HD-B/PC-b1/b2. The combined video image HD-B/PC-b1/b2 is transferred to the video conference terminal 110C at the site C. On the display screen of the video conference terminal 110C of the site C, the combined video image HD-B/PC-b1/b2 is disposed in the right half thereof, and the video image C at the own site of the site C is disposed and displayed in the remaining left half. Further, the video images C, b1, and b2 from respective sites from the site C, the site b1, and the site b2 are combined to further generate the combined video image HD-C/PC-b1/b2. The combined video image HD-C/PC-b1/b2 is transferred to the video conference terminal 110B of the site B. On the display screen of the video conference terminal 110B of the site B, the combined video image HD-C/PC-b1/b2 is disposed in the right half thereof, and the video image B at the own site of the site B is disposed and displayed in the remaining left half.

Further, at the virtual site A, the video images B, C, and b2 from respective sites from the sites B, C, and b2 are combined to generate the combined video image HD-B/C/PC-b2. The combined video image HD-B/C/PC-b2 is transferred to the Web conference terminal 130b1 of the site b1 through the virtual site a1. Further, the video images B, C, and b1 from respective sites from the sites B, C, and b1 are combined to generate the combined video image HD-B/C/PC-b1. The combined video image HD-B/C/PC-b1 is transferred to the Web conference terminal 130b2 of the site b2 through the virtual site a2.

Then, also in the second example illustrated in FIG. 13B, similarly to the first example described above, at the site b1, the combined video image HD-B/C/PC-b2 from the virtual site a1 is disposed in the right half of the display screen of the Web conference terminal 130b1, and the video image b1 at the own site of the site b1 is combined and displayed in a state of being disposed in the remaining left half. On the other hand, at the site b2, the combined video image HD-B/C/PC-b1 from the virtual site a2 is disposed in the right half of the display screen of the Web conference terminal 130b2, and the video image b2 at the own site of the site b2 is combined and displayed in the state of being disposed in the remaining left half.

As described above, similarly to the first embodiment, the conference system of the second embodiment is operated, so that the same video image is not returned and a generation of a phenomenon of a video loop, in which the combined video image is repeatedly transferred, and a video image like a mirror is displayed, is prevented.

As described above, in the second embodiment, in the relay units 120a1 and 120a2 of the management terminal device CL, only the combined video image of the video image in at each of the sites B and C of the video conference system MS11 is transmitted to the Web conference connection units 130a1 and 130a2, respectively. The video image sent from other sites b1 and b2 of the Web conference system MS12 is transmitted to the video conference multipoint connection unit 110A of the management terminal device CL. With this configuration, it is possible to suppress that the same video image is repeatedly transferred between a plurality of conference systems. For that reason, a video loop can be avoided, an appropriate video image display screen can be obtained at each site, and a smooth video conference can be executed by sharing a conference video image between the sites. Accordingly, it is possible to improve a display mode when sharing a conference video image by making a plurality of video conference systems cooperate with each other.

As described above, the conference system of the first embodiment includes the video conference system MS11 as an example of the first conference system and the Web conference system MS12 as an example of the second conference system. The video conference multipoint connection unit 110A as an example of a first transmission/reception unit that transmits and receives the video image data acquired at the site of the video conference system MS11, and the Web conference connection units 130a1 and 130a2 as an example of a second transmission/reception unit that transmit and receive the video image data acquired at the site of the Web conference system MS12 are provided. Further, relay units 120a1 and 120a2 are provided which transfers data to each other between the video conference multipoint connection unit 110A and the Web conference connection units 130a1 and 130a2, transmits the first video image data to the Web conference connection units 130a1 and 130a2, respectively, and transmits the second video image data to the video conference multipoint connection unit 110A. The relay units 120a1 and 120a2 transmit only the combined video image of the video image at each site of the video conference system MS11 as the first video image data to the Web conference connection units 130a1 and 130a2, respectively, and transmit the video image sent from each of the Web conference connection units 130a1 and 130a2 as the second video image data to the video conference multipoint connection unit 110A. With this configuration, a video loop is avoided without the same video image being transferred repeatedly between a plurality of conference systems.

In the second embodiment, the video conference multipoint connection unit 110A transmits the combined video image obtained by combining video images at a plurality of sites of the video conference system MS11 to each of the video conference terminals 110B and 110C as an example of the third terminals provided at the respective sites of the video conference system MS11, and transmits the second video image data sent from the relay units 120a1 and 120a2 to each of the video conference terminals 110B and 110C at the respective sites of the video conference system MS11 when transferring data to each of the Web conference connection units 130a1 and 130a2 by the relay units 120a1 and 120a2. With this configuration, the same video image is not repeatedly transferred, and the combined video image is generated in a state where the video image of each site does not overlap and is displayed on each terminal. For that reason, it is possible to prevent the occurrence of the video loop phenomenon in which the video image like a mirror with repeated nesting of the combined video image is displayed.

In the second embodiment, each of the Web conference connection units 130a1 and 130a2 transmits the video image at its own site of the Web conference system MS12 to each of the Web conference terminals 130b1 and 130b2 as an example of a fourth terminal provided at other sites of the Web conference system MS12, and transmits the video image of the first video image data sent from the relay units 120a1 and 120a2 to each of the Web conference terminals 130b1 and 130b2 of other sites of the Web conference system MS12 when transferring data to the video conference multipoint connection unit 110A by the relay units 120a1 and 120a2. With this configuration, the same video image is not repeatedly transferred, and the combined video image is generated in a state where the video image of each site does not overlap and is displayed on each terminal. For that reason, it is possible to prevent the occurrence of the video loop phenomenon in which the video image like a mirror with repeated nesting of the combined video image is displayed.

The video conference device according to the second embodiment includes the relay units 120a1 and 120a2 that transmit the video image data acquired at the site of the first conference system (video conference system MS11) to each of the Web conference connection units 130a1 and 130a2 as an example of a second transmission/reception unit provided in the second conference system (Web conference system MS12), and transmits the video image data of the second conference system to the video conference multipoint connection unit 110A as an example of a first transmission/reception unit provided in the first conference system. In the second embodiment, the video conference device is configured as the management terminal device CL including the functions of the video conference multipoint connection unit 110A, the relay units 120a1 and 120a2, and the Web conference connection units 130a1 and 130a2. Each of the relay units 120a1 and 120a2 transmits only the combined video image of the video image at each site of the video conference system MS11 as the first video image data to each of the Web conference connection units 130a1 and 130a2, and transmits the video image sent from each of the Web conference connection units 130a1 and 130a2 as the second video image data to the video conference multipoint connection unit 110A. With this configuration, a video loop is avoided without the same video image being transferred repeatedly between a plurality of conference systems.

Modified Example of Second Embodiment

Next, a modified example of the second embodiment will be described. In the present modified example, the management terminal device CL is not provided with the relay unit (120a1 and 120a2, see FIGS. 11, 12A, and 12B). Instead, in the present modified example, the functions of the relay units (120a1 and 120a2) are realized by the video conference multipoint connection unit 110A of the management terminal device CL, that is, the video conference multipoint connection unit 110A of the management terminal device CL of the present modified example also includes a function as the relay units (120a1 and 120a2).

Specifically, in the present modified example, the video conference multipoint connection unit 110A of the management terminal device CL as an example of the first transmission/reception unit transmits data each other between the Web conference connection units 130a1 and 130a2 as an example of the second transmission/reception unit, transmits the first video image data to each of the Web conference connection units 130a1 and 130a2, and receives the second video image data from each of the Web conference connection units 130a1 and 130a2. At the same time, the video conference multipoint connection unit 110A of the management terminal device CL transmits only the combined video image of the video image at each site of the video conference system MS11 as the first video image data to each of the Web conference connection units 130a1 and 130a2.

In addition, the video conference multipoint connection unit 110A transmits the combined video image obtained by combining video images at a plurality of sites of the video conference system MS11 to each of the video conference terminals 110B and 110C as an example of the third terminal provided at the respective sites of the video conference system MS11, and transmits the second video image data to each of the video conference terminals 110B and 110C at the respective sites of the video conference system MS11 when transferring data to each of the Web conference connection units 130a1 and 130a2.

Further, each of the Web conference connection units 130a1 and 130a2 of the present modified example transmits the video image at its own site of the Web conference system MS12 to each of the Web conference terminals 130b1 and 130b2 as an example of the fourth terminal provided at other sites of the Web conference system MS12, and transmits the video image of the first video image data to each of the Web conference terminals 130b1 and 130b2 of the other sites of the Web conference system MS12 when transferring data to the video conference multipoint connection unit 110A. The other configurations and their effects are the same as those in the second embodiment described above.

Although various embodiments have been described with reference to the drawings, it goes without saying that the present disclosure is not limited to such examples. It is obvious to those skilled in the art that various changes or modifications can be made within the scope described in the claims, and it is understood that those various changes or modifications naturally belong to the technical scope of the present disclosure. Further, constitutional elements in the embodiment described above may be combined as occasion demands, without departing from the spirit of the invention.

In addition, the present disclosure may also be applied to a program which is for realizing the functions of the video image processing method according to the above-described embodiment, is supplied to an information processing device (terminal) which is a computer via a network or various storage media, and is read and executed by a processor of the information processing device, and a recording medium on which the program is stored.

The present disclosure is useful as a conference system, a video conference apparatus, and a video image processing method that suppress occurrence of looping of a video image when transferring a video image by making a plurality of conference systems cooperate with each other, and allows an appropriate conference video image to be shared between the plurality of conference systems.

What is claimed is:

1. A conference system comprising:
a first terminal that is communicatively coupled to at least one first additional terminal, the first terminal being configured to generate first video image data and the first terminal being constituted of a server computer for the cloud; and
a second terminal that is communicatively coupled to the first terminal and at least one second additional terminal, the second terminal being configured to generate second video image data and the second terminal being constituted of a server computer for the cloud, wherein
the first terminal is configured to transmit the first video image data to the second terminal, and the second terminal is configured to transmit the second video image data to the first terminal,
in a case where a loop avoidance function is disabled, the first video image data includes a combined video image that includes video images generated by the first terminal, the at least one first additional terminal communicatively coupled to the first terminal, the second terminal, and the at least one second additional terminal communicatively coupled to the second terminal, and in a case where the loop avoidance function is enabled, the first video image data includes a combined video image that includes video images generated by the first terminal and the at least one first additional terminal communicatively coupled to the first terminal, and omits video images generated by the second terminal and the at least one second additional terminal communicatively coupled to the second terminal such that the first video image data is transmitted to the second terminal without the video images generated by the second terminal and the at least one second additional terminal communicatively coupled to the second terminal.

2. The conference system according to claim 1, wherein the at least one first additional terminal includes a third terminal and a fourth terminal, and
the first terminal is configured to generate and transmit third video image data to the third terminal, the third video image data including a combined video image that includes video images generated by the first terminal and the fourth terminal.

3. The conference system according to claim 1, wherein the second terminal is configured to generate and transmit third video image data to the at least one second additional terminal communicatively coupled to the second terminal, the third video image data including the video image generated by the second terminal.

4. A video conference apparatus comprising:
a first terminal that is communicatively coupled to at least one first additional terminal, the first terminal being constituted of a server computer for the cloud and the first terminal being configured to generate first video image data and transmit the first video image data to a second terminal, wherein
the second terminal is communicatively coupled to the first terminal and at least one second additional terminal, and the second terminal is constituted of a server computer for the cloud,
the second terminal is configured to generate second video image data and transmit the second video image data to the first terminal,
in a case where a loop avoidance function is disabled, the first video image data includes a combined video image that includes video images generated by the first terminal, the at least one first additional terminal communicatively coupled to the first terminal, the second terminal, and the at least one second additional terminal communicatively coupled to the second terminal, and
in a case where the loop avoidance function is enabled, the first video image data includes a combined video image that includes video images generated by the first terminal and the at least one first additional terminal communicatively coupled to the first terminal, and omits video images generated by the second terminal and the at least one second additional terminal communicatively coupled to the second terminal such that the first video image data is transmitted to the second terminal without the video images generated by the second terminal and the at least one second additional terminal communicatively coupled to the second terminal.

5. A video image processing method in a conference system, the video image processing method comprising:
generating, by a first terminal, first video image data, the first terminal being constituted of a server computer for the cloud and the first terminal being communicatively coupled to at least one first additional terminal;
generating, by a second terminal, second video image data, the second terminal being constituted of a server computer for the cloud and the second terminal communicatively coupled to the first terminal and at least one second additional terminal;
transmitting, by the first terminal, the first video image data to the second terminal;
transmitting, by the second terminal, the second video image data to the first terminal, wherein
in a case where a loop avoidance function is disabled, the first video image data includes a combined video image that includes video images generated by the first terminal, the at least one first additional terminal communicatively coupled to the first terminal, the second terminal, and the at least one second additional terminal communicatively coupled to the second terminal, and
in a case where the loop avoidance function is enabled, the first video image data includes a combined video image that includes video images generated by the first terminal and the at least one first additional terminal communicatively coupled to the first terminal, and omits video images generated by the second terminal and the at least one second additional terminal communicatively coupled to the second terminal such that the first video image data is transmitted to the second terminal without the video images generated by the second terminal and the at least one second additional terminal communicatively coupled to the second terminal.

6. The conference system according to claim 1, wherein, in the case where the loop avoidance function is enabled, the second video image data includes a combined video image that includes video images generated by the first terminal, the at least one first additional terminal communicatively coupled to the first terminal, and the at least one second additional terminal communicatively coupled to the second terminal.

7. The conference system according to claim 1, wherein the second video image data includes video images generated by the second terminal and the at least one second additional terminal communicatively coupled to the second terminal.

8. The conference system according to claim 2, wherein the second video image data includes video images generated by the second terminal and the at least one second additional terminal communicatively coupled to the second terminal, and
the third video image data includes a combined video image that includes the video images generated by the first terminal and the fourth terminal and the video images generated by the second terminal and the at least one second additional terminal communicatively coupled to the second terminal.

9. The conference system according to claim 1, wherein in the case where the loop avoidance function is enabled, the second terminal is configured to combine and display the video image generated by the at least one second additional terminal communicatively coupled to the second terminal and the combined video image included in the first video image data.

10. The conference system according to claim 1, wherein the second terminal is configured to transmit the first video image data to the at least one second additional terminal communicatively coupled to the second terminal.

11. The conference system according to claim 1, wherein the first terminal is a server computer for the cloud different from a server computer for the cloud of the second terminal.

12. The conference system according to claim 1, wherein a conference system of the first terminal is a conference system different from a conference system of the second terminal.

13. The conference system according to claim 1, wherein the first terminal is a video conference system and the second terminal is a Web conference system.

14. The conference system according to claim 1, wherein the first terminal has a different communication protocol from that of the second terminal.

15. The conference system according to claim 1, wherein the first terminal is configured to transmit the first video image data to the second terminal via a relay unit, and the second terminal is configured to transmit the second video image data to the first terminal via the relay unit.

16. The conference system according to claim 1, wherein the first terminal and the second terminal are connected by software,
the first terminal and the first additional terminal are connected by a communication interface, and
the second terminal and the second additional terminal are connected by a communication interface.

17. The conference system according to claim 1, wherein the loop avoidance function is enabled in response to the first terminal being communicatively coupled to the second terminal.

* * * * *